(12) United States Patent
Kim et al.

(10) Patent No.: US 11,382,115 B2
(45) Date of Patent: Jul. 5, 2022

(54) METHOD AND DEVICE FOR TRANSMITTING OF UPLINK SIGNAL BY A USER EQUIPMENT IN A WIRELESS COMMUNICATION SYSTEM SUPPORTING AN UNLICENSED BAND

(71) Applicant: LG Electronics Inc., Seoul (KR)

(72) Inventors: Seonwook Kim, Seoul (KR); Joonkui Ahn, Seoul (KR); Suckchel Yang, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,873

(22) PCT Filed: Mar. 21, 2018

(86) PCT No.: PCT/KR2018/003275
§ 371 (c)(1),
(2) Date: Jun. 21, 2018

(87) PCT Pub. No.: WO2018/174550
PCT Pub. Date: Sep. 27, 2018

(65) Prior Publication Data
US 2021/0298045 A1    Sep. 23, 2021

Related U.S. Application Data

(60) Provisional application No. 62/584,123, filed on Nov. 10, 2017, provisional application No. 62/543,340,
(Continued)

(51) Int. Cl.
    *H04W 72/12* (2009.01)
    *H04W 72/04* (2009.01)
    (Continued)

(52) U.S. Cl.
    CPC ..... *H04W 72/1268* (2013.01); *H04W 72/042* (2013.01); *H04W 72/0413* (2013.01);
    (Continued)

(58) Field of Classification Search
    CPC ......... H04W 72/1268; H04W 72/0446; H04W 72/0413; H04W 72/042; H04W 72/1226;
    (Continued)

(56) References Cited

U.S. PATENT DOCUMENTS 10,348,453 B2 * 7/2019 Webb ................ H04W 72/1278
11,140,690 B2 * 10/2021 Um ..................... H04W 72/042
(Continued)

FOREIGN PATENT DOCUMENTS

CN    105578573    5/2016
CN    106465411    2/2017
(Continued)

OTHER PUBLICATIONS

NTT Docomo, "Status Report for RAN WG1 to TSG-RAG #76", Jun. 5-8, 2017, Florida USA, RP-170858 (Year: 2017).*
(Continued)

*Primary Examiner* — Michael K Phillips
(74) *Attorney, Agent, or Firm* — Fish & Richardson P.C.

(57) ABSTRACT

Disclosed herein are a method and device for transmitting an uplink signal by a user equipment (UE) in a wireless communication system supporting an unlicensed band.

12 Claims, 20 Drawing Sheets

Related U.S. Application Data filed on Aug. 9, 2017, provisional application No. 62/505,119, filed on May 12, 2017, provisional application No. 62/490,613, filed on Apr. 27, 2017, provisional application No. 62/479,283, filed on Mar. 30, 2017, provisional application No. 62/475,897, filed on Mar. 24, 2017, provisional application No. 62/474,554, filed on Mar. 21, 2017.

(51) Int. Cl.
  *H04W 72/06* (2009.01)
  *H04W 72/14* (2009.01)

(52) U.S. Cl.
  CPC ... *H04W 72/0446* (2013.01); *H04W 72/0453* (2013.01); *H04W 72/06* (2013.01); *H04W 72/1226* (2013.01); *H04W 72/14* (2013.01)

(58) Field of Classification Search
  CPC . H04W 72/06; H04W 72/0453; H04W 72/14; H04W 74/0808; H04W 16/14; H04W 74/0816; H04L 27/0006
  See application file for complete search history.

(56) References Cited

U.S. PATENT DOCUMENTS

| | | | |
|---|---|---|---|
| 2016/0345206 A1 | 11/2016 | Yerramalli et al. | |
| 2017/0325225 A1* | 11/2017 | Dinan | H04W 16/14 |
| 2018/0206129 A1 | 7/2018 | Choi et al. | |
| 2019/0029046 A1* | 1/2019 | Li | H04L 1/0003 |
| 2019/0246412 A1* | 8/2019 | Noh | H04L 5/008 |
| 2019/0327736 A1* | 10/2019 | Takeda | H04L 1/1887 |

FOREIGN PATENT DOCUMENTS

| | | | |
|---|---|---|---|
| JP | WO2016148243 | 1/2018 | |
| KR | 1020160004626 | 1/2016 | |
| KR | 1020160037766 | 4/2016 | |
| KR | 1020160134475 | 11/2016 | |
| KR | 1020160134497 | 11/2016 | |
| KR | 1020160137891 | 12/2016 | |
| KR | 1020160150276 | 12/2016 | |
| WO | WO-2016099135 A1 * | 6/2016 | H04L 5/0094 |
| WO | WO2016105125 | 6/2016 | |
| WO | WO2016115491 | 7/2016 | |
| WO | WO2016182355 | 11/2016 | |
| WO | WO2016186406 | 11/2016 | |
| WO | WO2017018762 | 2/2017 | |

OTHER PUBLICATIONS

Samsung, "Partial subframe for LAA", Oct. 5-9, 2015, 3GPP, 3GPP TSG RAN WG1 #82bis, R1-155474 (Year: 2015).*

Samsung et al., "Clarification on channel access procedure for SRS transmission," 3GPP TSG RAN WG1 Meeting #88, dated Feb. 13-17, 2017, 6 pages, R1-1703812.

Ericsson, "On Channel Access Mechanisms for NR in Unlicensed Spectrum," 3GPP TSG-RAN WG1 #88, dated Feb. 13-17, 2017, 3 pages, R1-1703305.

Broadcom, "Draft CR on eLAA UL Multicarrier channel access," 3GPP TSG RAN WG1 Meeting #86bis, dated Oct. 10-14, 2016, 6 pages, R1-1609777.

NTT Docomo, Inc., "Remaining details on channel access framework for eLAA," 3GPP TSG RAN WG1 Meeting #86, dated Aug. 22-26, 2016, 5 pages, R1-167345.

Extended European Search Report in European Application No. 18770760.9, dated Dec. 19, 2019, 14 pages.

Huawei, HiSilicon, "Candidate starting positions of partial subframe and corresponding RS pattern for LAA," R1-153787, 3GPP TSG RAN WG1 Meeting #82, Beijing, China, dated Aug. 24-28, 2015, 5 pages, XP051001233.

LG Electronics, "LBT schemes in LAA UL," R1-162473, 3GPP TSG RAN WG1 meeting #84bis, Busan, Korea, dated Apr. 11-15, 2016, 11 pages, XP051080211.

Samsung, "Partial subframe for LAA," R1-155474, 3GPP TSG RAN WG1 #82bis, Malmo, Sweden, dated Oct. 5-9, 2015, 6 pages, XP051002379.

Huawei, HiSilicon, "Contention window size adjustment for UL category 4 LBT for eLAA," R1-162129, 3GPP TSG RAN WG1 Meeting #84bis, Busan, Korea, Apr. 11-15, 2016, 4 pages.

Japanese Office Action in Japanese Appln. No. 2019-531783, dated Jun. 30, 2020, 5 pages (with English translation).

Qualcomm Incorporated, "On performance requirements for Rel-14 eLAA," R4-1609708, 3GPP TSG-RAN WG4 #81, Reno, United States, Nov. 14-18, 2016, 5 pages.

RAN1, "Response LS to IEEE 802.11 regarding LAA", R2-1700692, 3GPP TSG RAN WG2#97, Athens, Greece, Feb. 13-17, 2017, 13 pages, R2-1700692.

CN Office Action in Chinese Appln. No. 201880002817.9, dated Dec. 27, 2021, 21 pages (with English translation).

* cited by examiner (a)

(b)

(a) (b)

(a) (b)

METHOD AND DEVICE FOR TRANSMITTING OF UPLINK SIGNAL BY A USER EQUIPMENT IN A WIRELESS COMMUNICATION SYSTEM SUPPORTING AN UNLICENSED BAND

CROSS-REFERENCE TO RELATED APPLICATIONS

This application is a National Stage application under 35 U.S.C. § 371 of International Application No. PCT/KR2018/003275, filed on Mar. 21, 2018, which claims the benefit of U.S. Provisional Application No. 62/584,123, filed on Nov. 10, 2017, U.S. Provisional Application No. 62/543,340, filed on Aug. 9, 2017, U.S. Provisional Application No. 62/505,119, filed on May 12, 2017, U.S. Provisional Application No. 62/490,613, filed on Apr. 27, 2017, U.S. Provisional Application No. 62/479,283, filed on Mar. 30, 2017, U.S. Provisional Application No. 62/475,897, filed on Mar. 24, 2017, and U.S. Provisional Application No. 62/474,554, filed on Mar. 21, 2017. The disclosures of the prior applications are incorporated by reference in their entirety.

TECHNICAL FIELD

The following description relates to a wireless communication system and, more particularly, to a method and device for transmitting an uplink signal by a user equipment (UE) in a wireless communication system supporting an unlicensed band.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method and device for transmitting an uplink signal by a user equipment (UE) through an unlicensed band when a newly proposed wireless communication system supports the unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and device for transmitting an uplink signal by a user equipment (UE) in a wireless communication system supporting an unlicensed band.

The object of the present invention can be achieved by providing a method of transmitting an uplink signal by a user equipment (UE) in a wireless communication system supporting an unlicensed band including receiving information indicating a first time point for uplink signal transmission in the unlicensed band from a base station and performing uplink signal transmission in one of a first transmission mode or a second transmission mode according to an operation mode of the UE, wherein the first transmission mode is an operation mode for transmitting the uplink signal in the unlicensed band depending on whether the UE successfully performs a channel access procedure of the unlicensed band at the first time point and a predetermined second time point after the first time point, and wherein the second transmission mode is an operation mode for transmitting the uplink signal in the unlicensed band depending on whether the UE successfully performs a channel access procedure of the unlicensed band at a third time point obtained by applying a predetermined time offset to the first time point.

In another aspect of the present invention, provided herein is a user equipment (UE) for transmitting an uplink signal in a wireless communication system supporting an unlicensed band including a transmission unit, a reception unit and a processor connected to the transmission unit and the reception unit to operate, wherein the processor is configured to receive information indicating a first time point for uplink signal transmission in the unlicensed band from a base station and to perform uplink signal transmission in one of a first transmission mode or a second transmission mode according to an operation mode of the UE, wherein the first transmission mode is an operation mode for transmitting the uplink signal in the unlicensed band depending on whether the UE successfully performs a channel access procedure of the unlicensed band at the first time point and a predetermined second time point after the first time point, and wherein the second transmission mode is an operation mode for transmitting the uplink signal in the unlicensed band depending on whether the UE successfully performs a channel access procedure of the unlicensed band at a third time point obtained by applying a predetermined time offset to the first time point.

In the above configuration, the information indicating the first time point may indicate one of a boundary of symbol index #0 in a corresponding subframe, the boundary of symbol index #0 in the corresponding subframe+25 μsec, the boundary of symbol index #0 in the corresponding subframe+25 μsec+TA (timing advance), and a boundary of symbol index #1 in the corresponding subframe as the first time point, and wherein the TA is a TA value set with respect to the UE.

The second time point may be a boundary of symbol index #7 in a corresponding subframe.

The third time point may be obtained by applying a time offset of 0.5 ms to the first time point.

The operation mode of the UE may be determined based on one or more of first mode information indicating the first transmission mode received from the base station or second mode information indicating the second transmission mode.

The first mode information and the second mode information may be received through downlink control information (DCI).

If the uplink signal includes uplink control information (UCI), the UCI may be transmitted in a second slot of a corresponding subframe.

At this time, the UCI may include one or more of a rank indicator (RI) and channel state information (CSI).

If the UCI includes the RI and the CSI, the RI may be mapped to a symbol adjacent to a symbol, to which a demodulation reference signal (DM-RS) is mapped, with higher priority than the CSI.

When the UE successfully performs the channel access procedure of the unlicensed band at the second time point in the first transmission mode and transmits the uplink signal in the unlicensed band starting from the second time point, the uplink signal may be transmitted by puncturing a first slot of a corresponding subframe.

If a first subframe, in which the UE successfully performs the channel access procedure of the unlicensed band at the second time point in the first transmission mode and transmits the uplink signal in the unlicensed band starting from the second time point, is a first subframe of a first uplink burst, the UE may perform a channel access procedure, to which a contention window size (CWS) adjusted depending on whether new data indicators (NDIs) for the first subframe and a next subframe of the first subframe are toggled is applied, and attempts to transmit a second uplink burst which is a next uplink burst of the first uplink burst.

At this time, when at least one of the NDIs for the first subframe and the next subframe of the first subframe is toggled, a CWS for transmission of a second uplink burst is reset and, when both the NDIs for the first subframe and the next subframe of the first subframe are not toggled, the CWS for transmission of the second uplink burst may be increased to be greater than a CWS for transmission of the first uplink burst.

If a first subframe, in which the UE successfully performs the channel access procedure of the unlicensed band at the second time point in the first transmission mode and transmits the uplink signal in the unlicensed band starting from the second time point, is a first subframe of a first uplink burst and a second uplink grant which is a next uplink burst of the first uplink burst is received after four subframes from the first subframe, the UE may perform a channel access procedure, to which a contention window size (CWS) adjusted depending on whether new data indicators (NDIs) for one or more subframes included in a third uplink burst, which is a previous uplink burst of the first uplink burst are toggled, is applied, and attempts to transmit the second uplink burst.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a UE can attempt transmission of an uplink signal to a base station at various time points as compared to the related art.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
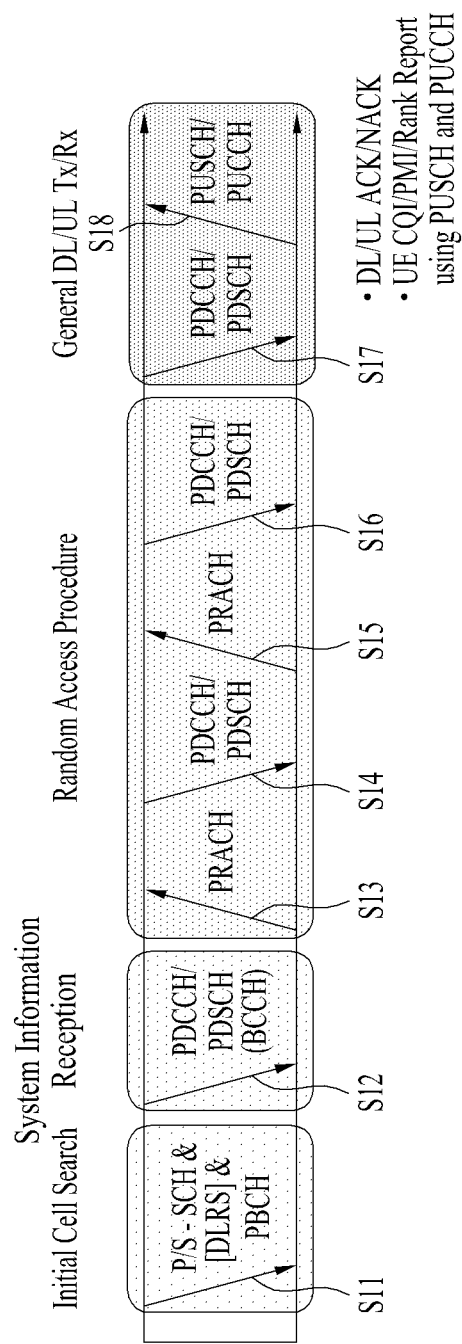
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
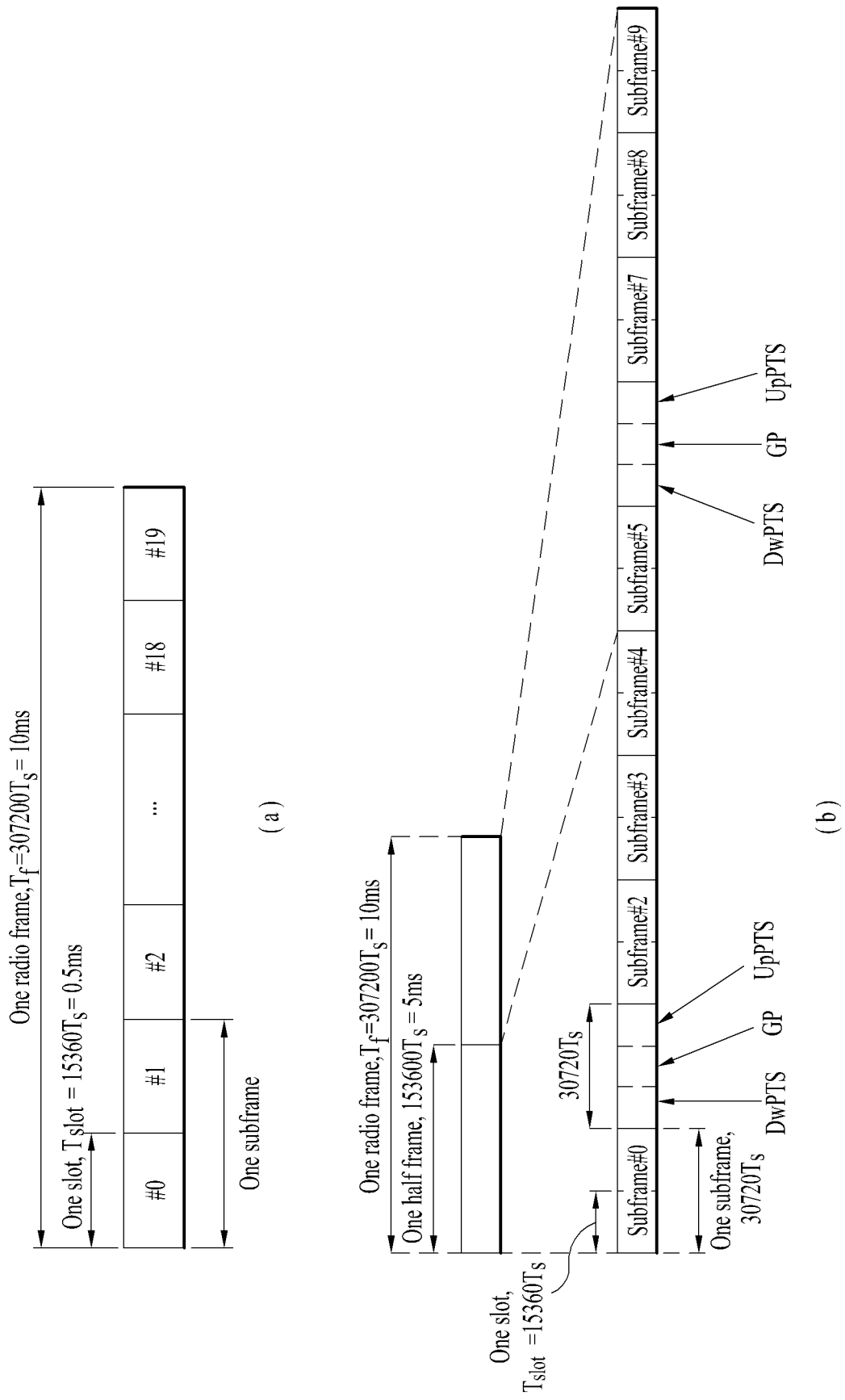
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | |
| --- | --- | --- | --- | --- | --- |
| | | | UpPTS | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink)

TABLE 2

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
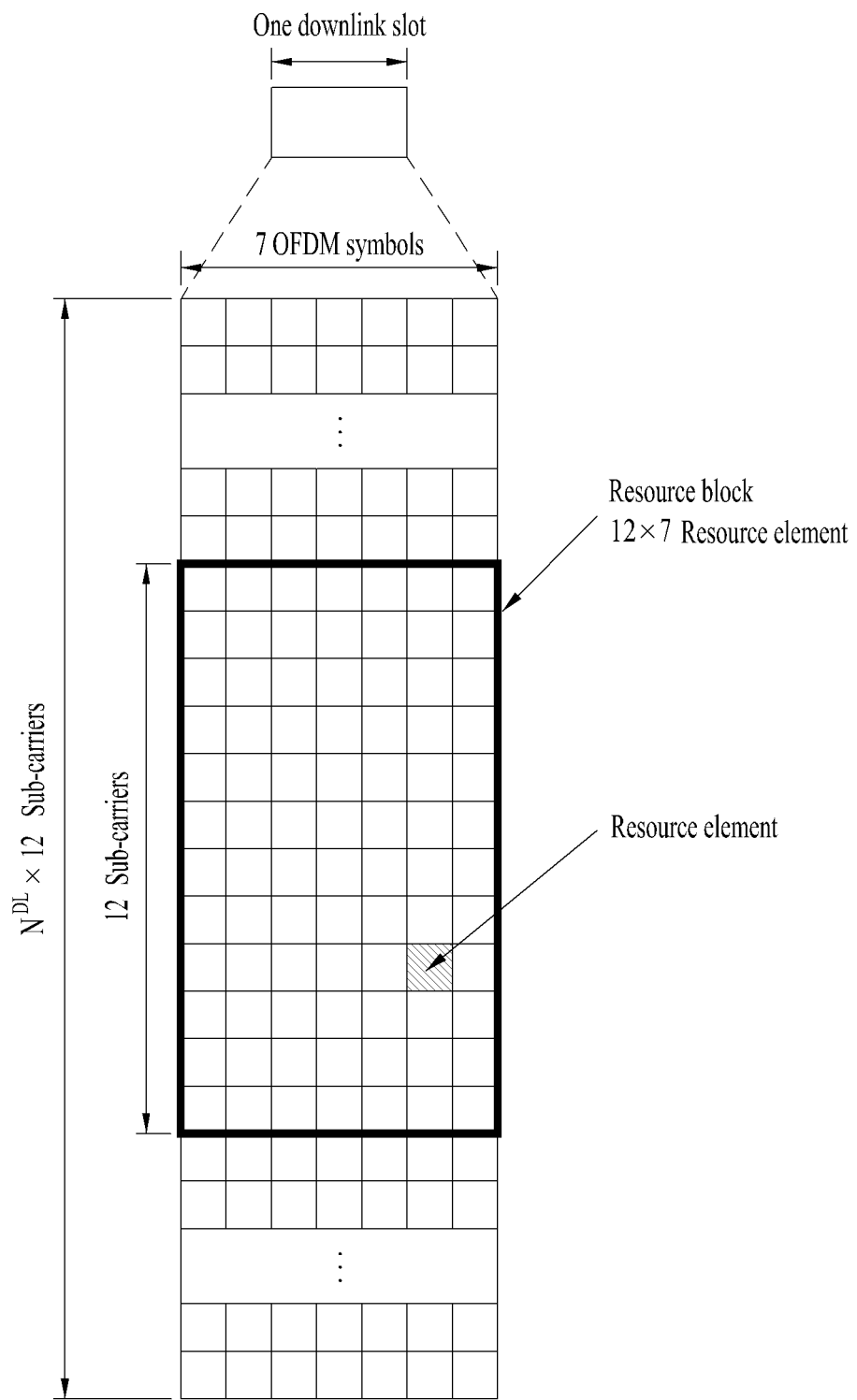
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 1207 REs. The number of RBs in a DL slot, NDL depends on a DL transmission bandwidth.

Figure 4:
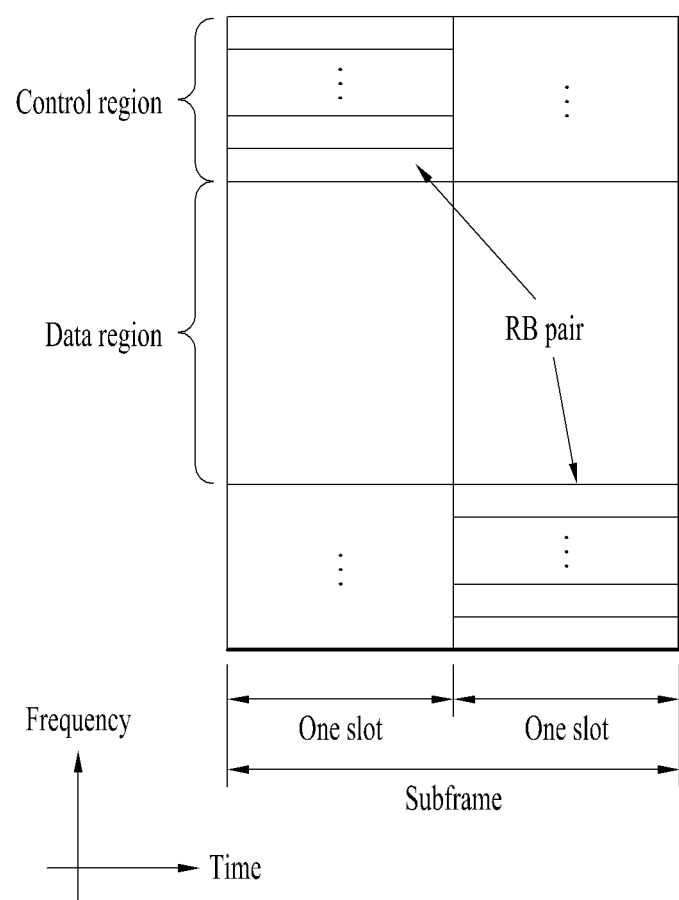
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
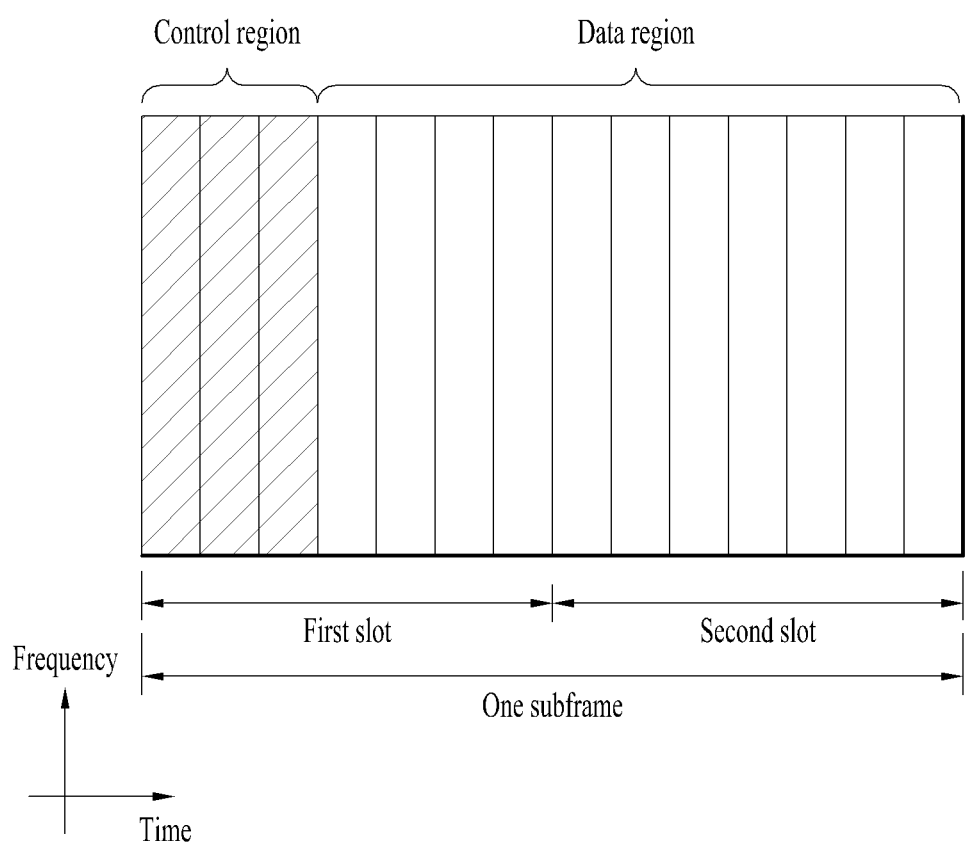
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement, and measure the RSRP or RSRQ according to the information of 'measConfig'.

Here, RSRP, RSRQ, and RSSI disclosed in the LTE system may be defined as follows.

First, reference signal received power (RSRP) is defined as the linear average over the power contributions (in [W]) of the resource elements that carry cell-specific reference signals within the considered measurement frequency bandwidth. For example, for RSRP determination the cell-specific reference signals $R_0$ shall be used. If the UE can reliably detect that $R_1$ is available it may use $R_1$ in addition to $R_0$ to determine RSRP. The reference point for the RSRP shall be the antenna connector of the UE.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE) transmitted on system information block type 3 (SIB3). Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
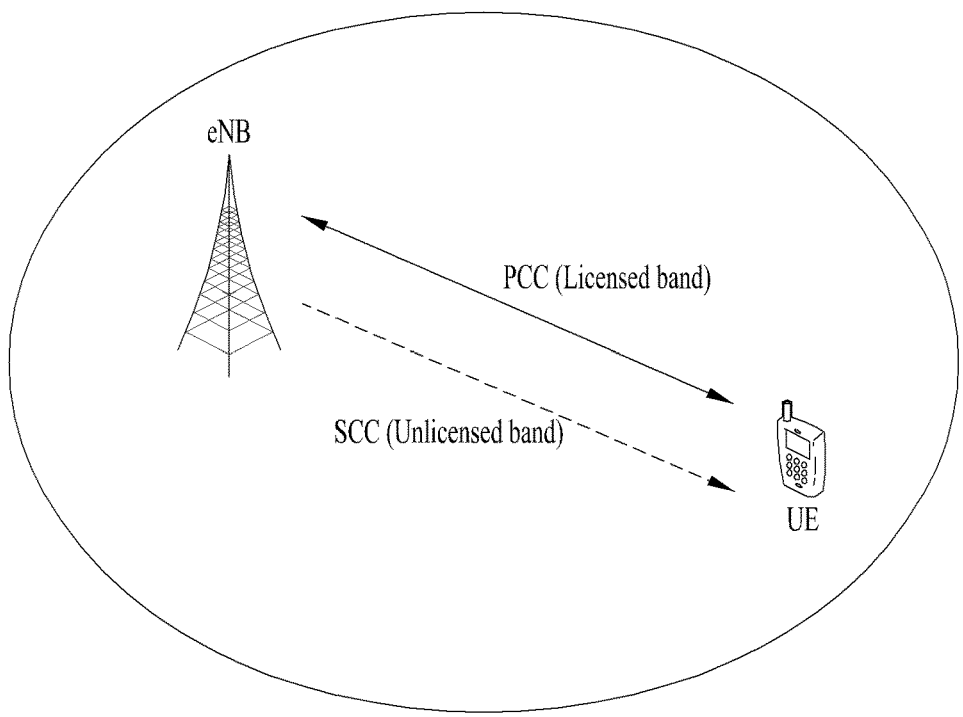
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
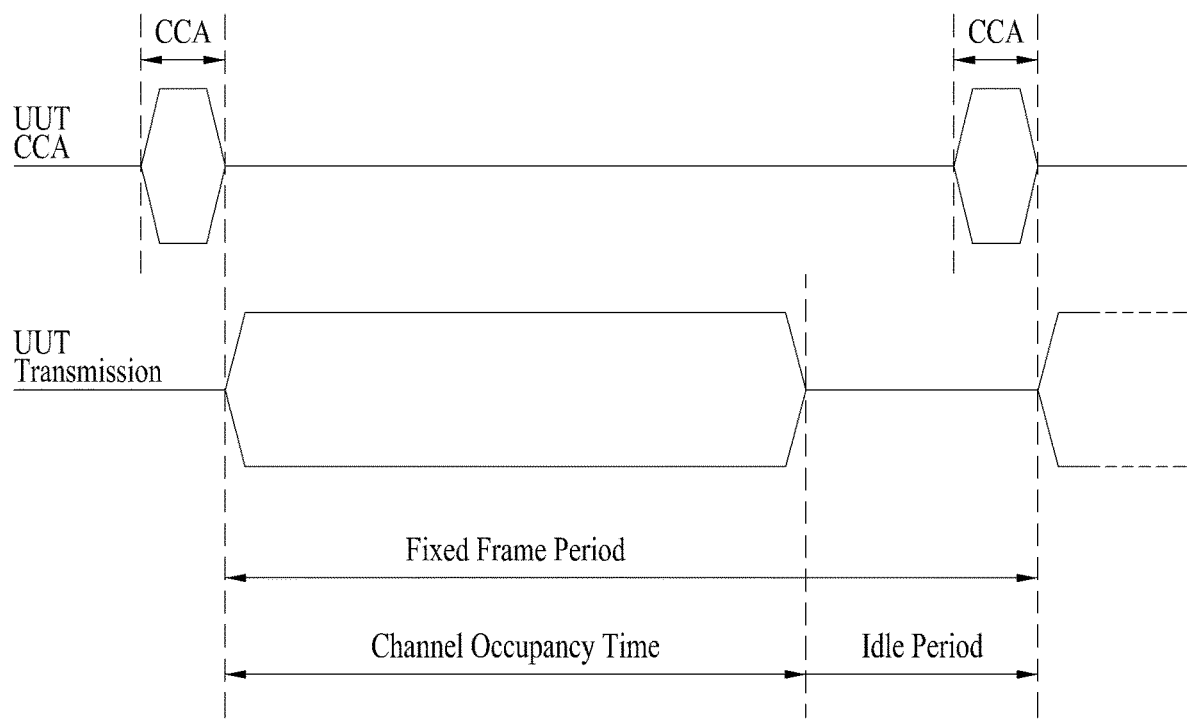
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
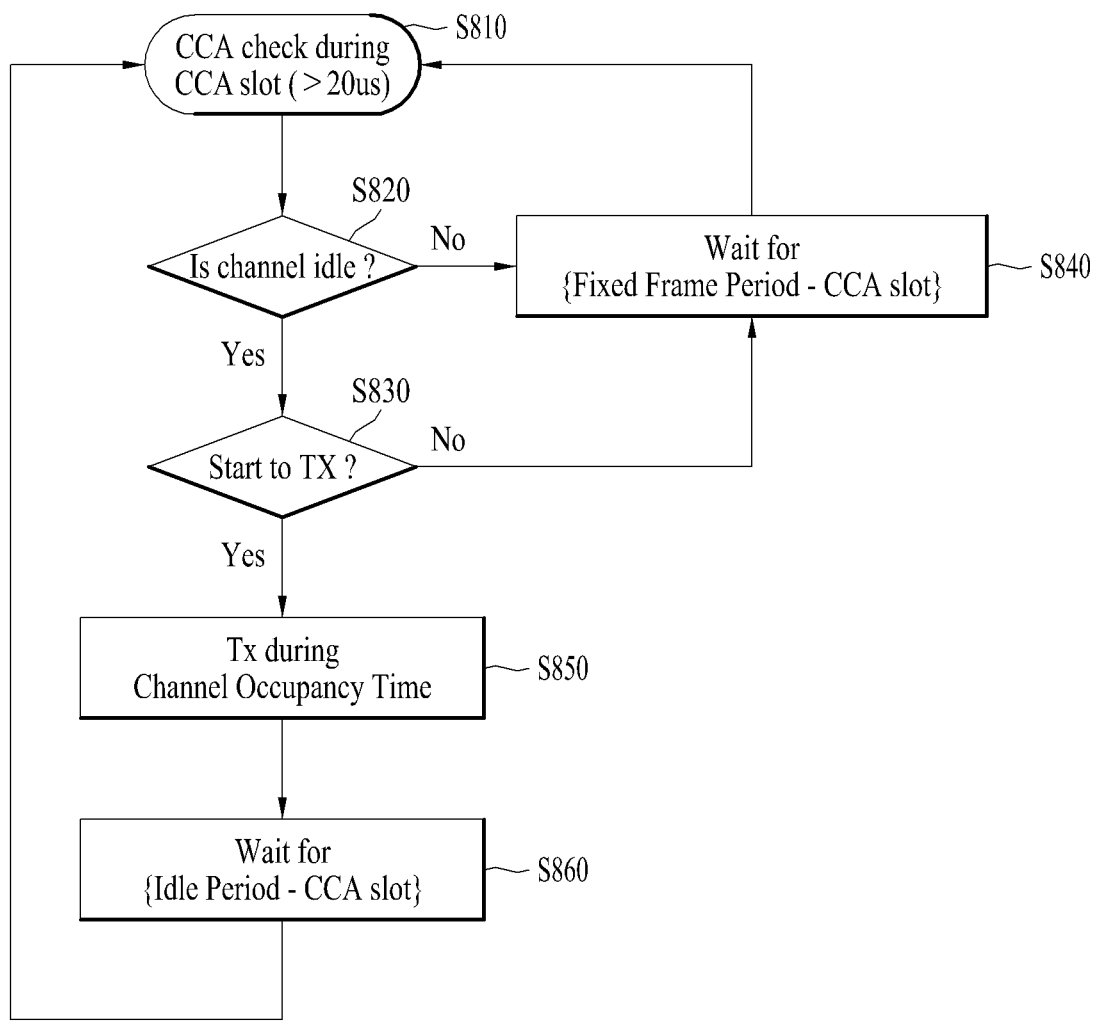
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9:
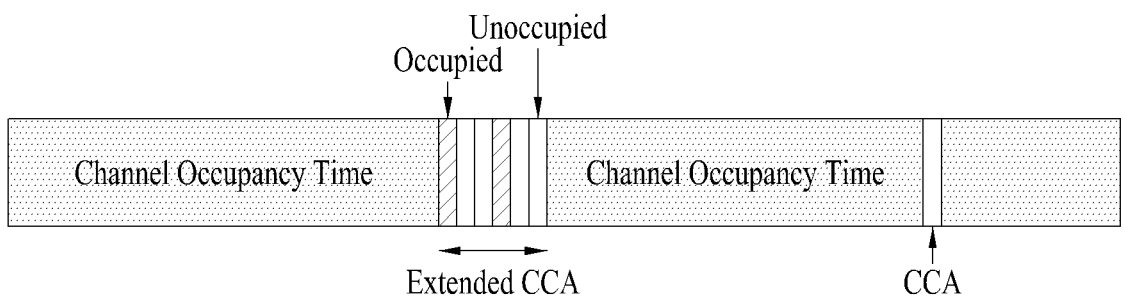
FIG. 9 is a diagram illustrating an exemplary Load Based Equipment (LBE) operation as one of the LBT operations.
Figure 9:
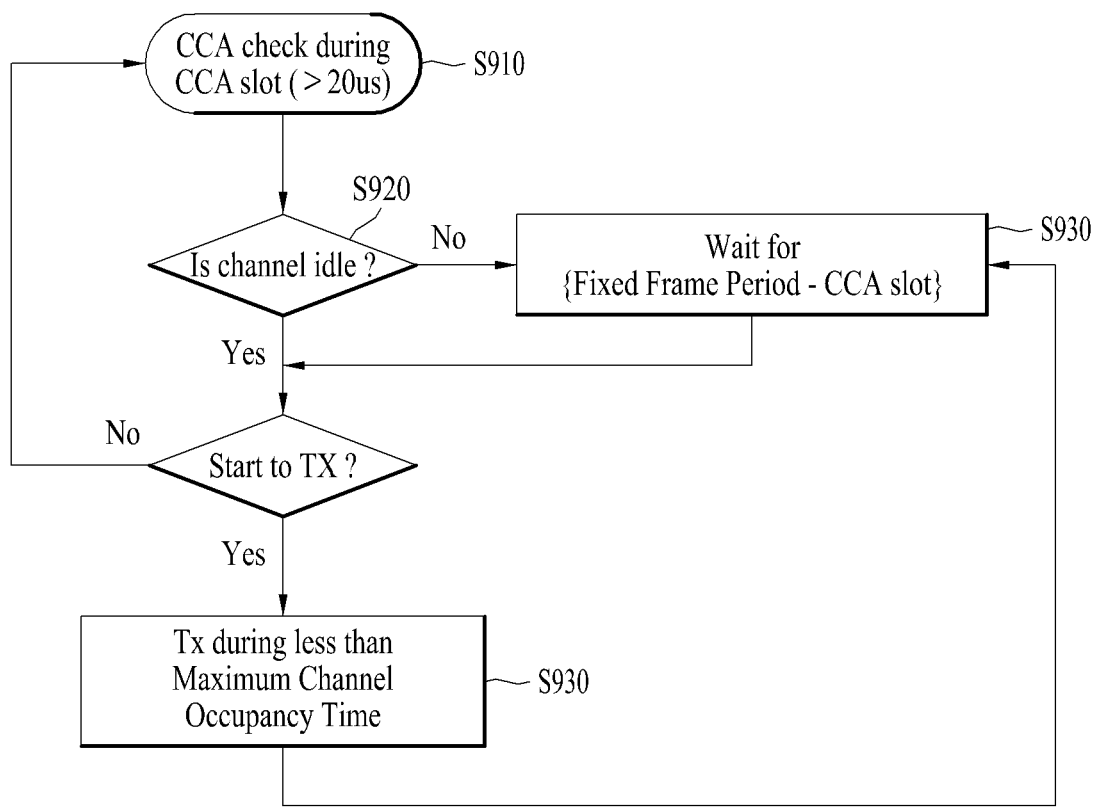

FIG. 9 is a view illustrating an exemplary LBE operation as one of the LBT operations.

Referring to FIG. 9($a$), in LBE, the communication node first sets q (q∈{4, 5, . . . , 32}) and then performs CCA during one CCA slot.

FIG. 9($b$) is a block diagram illustrating the LBE operation. The LBE operation will be described with reference to FIG. 9($b$).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
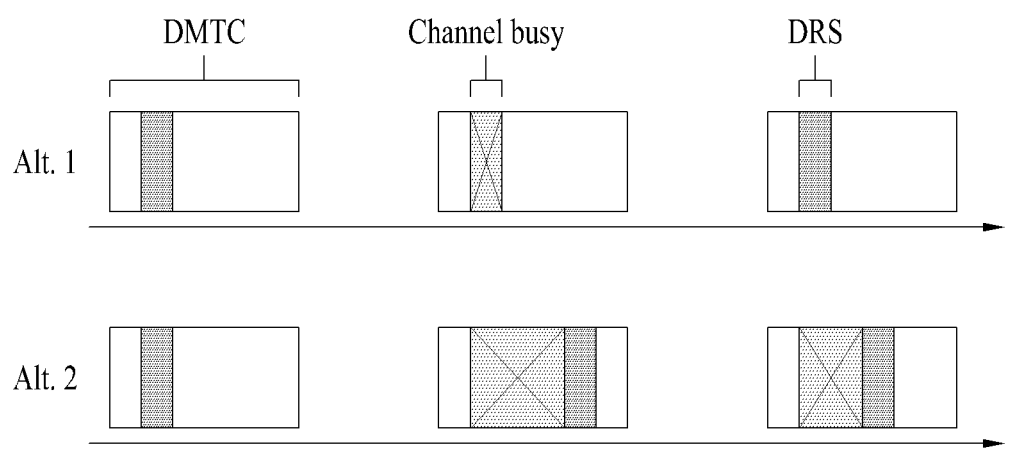
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
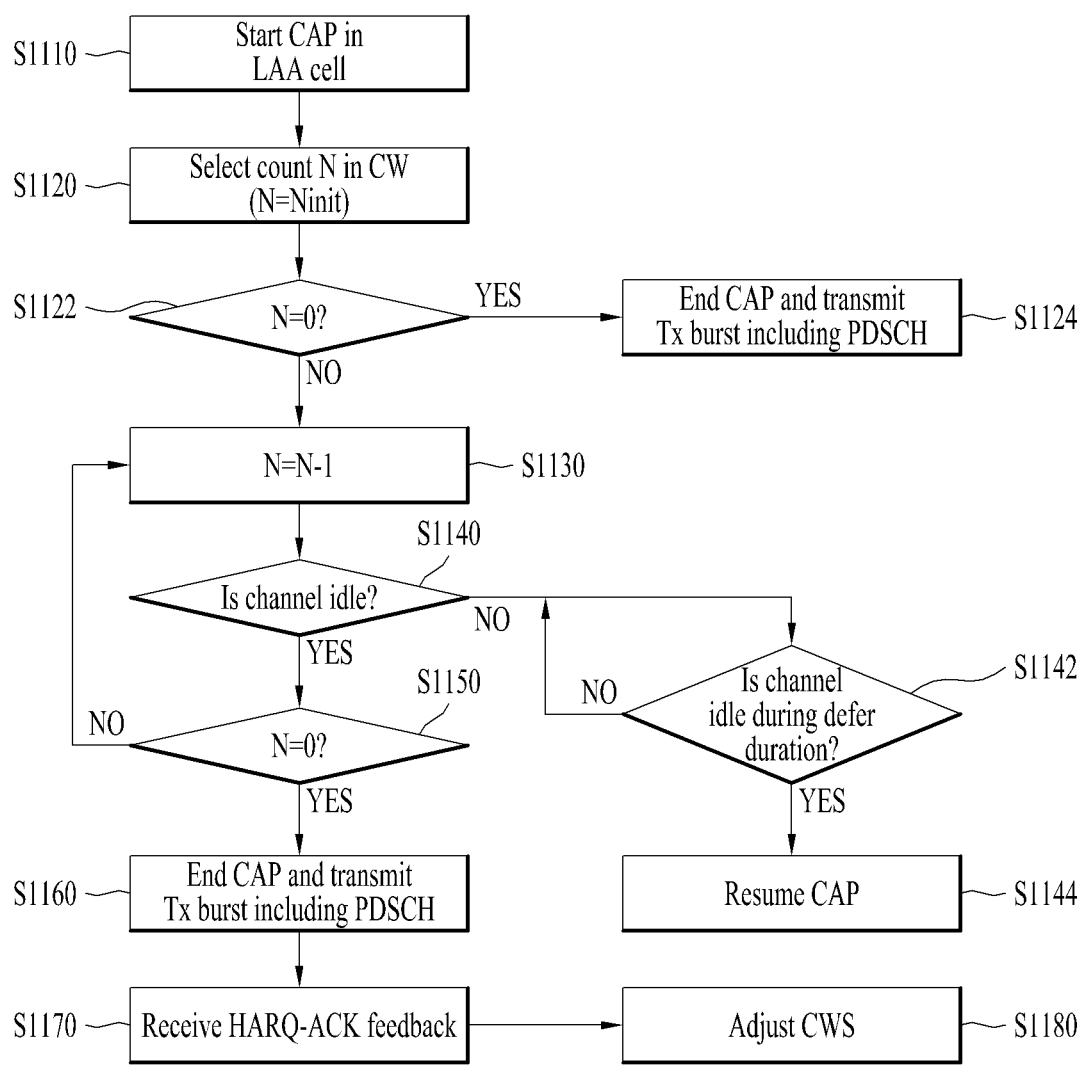
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 3

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 3, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 3, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 12:
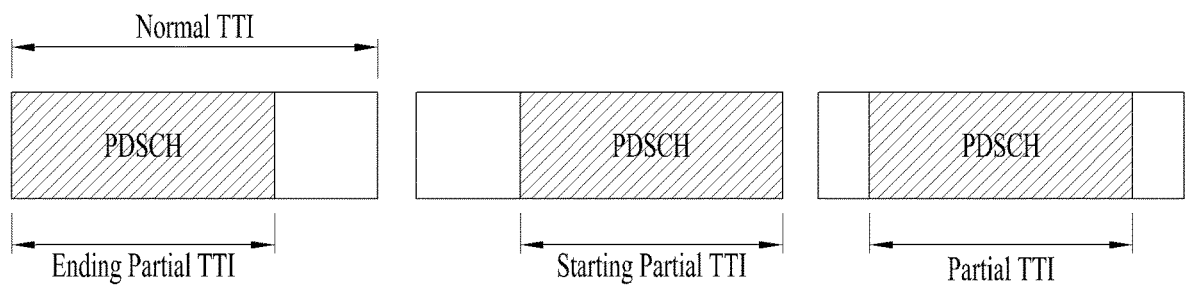
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

3.1. Numerologies

The NR system to which the present invention is applicable supports various OFDM numerologies shown in the following table. In this case, the value of p and cyclic prefix information per carrier bandwidth part can be signaled in DL and UL, respectively. For example, the value of p and cyclic prefix information per downlink carrier bandwidth part may be signaled though DL-BWP-mu and DL-MWP-cp corresponding to higher layer signaling. As another example, the value of p and cyclic prefix information per uplink carrier bandwidth part may be signaled though UL-BWP-mu and UL-MWP-cp corresponding to higher layer signaling.

TABLE 4

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

3.2. Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 5 shows the number of OFDM symbols in each slot/frame/subframe in the case of the normal cyclic prefix, and Table 6 shows the number of OFDM symbols in each slot/frame/subframe in the case of the extended cyclic prefix.

TABLE 5

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 6

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 13:
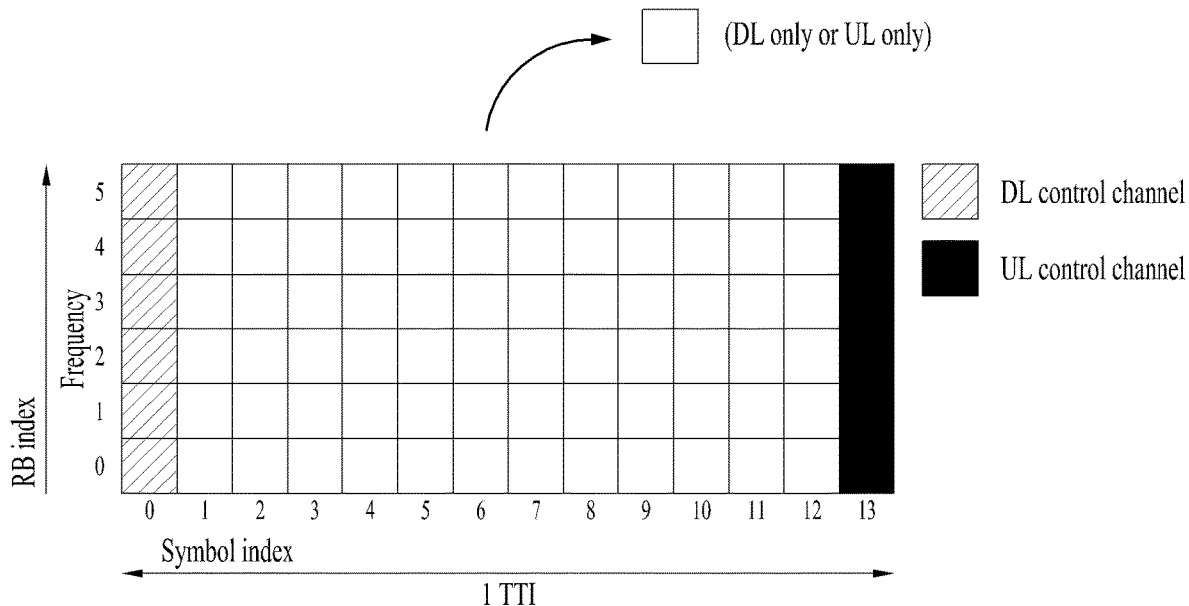
FIG. 13 is a diagram illustrating a self-contained subframe structure applicable to the present invention.

FIG. 13 is a diagram illustrating a self-contained slot structure applicable to the present invention.

In FIG. 13, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 13.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 14:
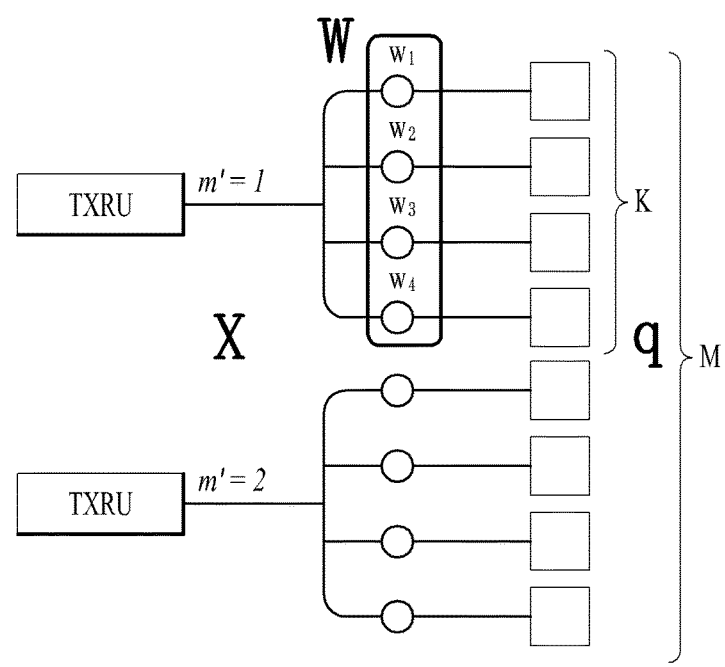
FIGS. 14 and 15 are diagrams illustrating representative connection methods for connecting TXRUs to antenna elements.
Figure 15:
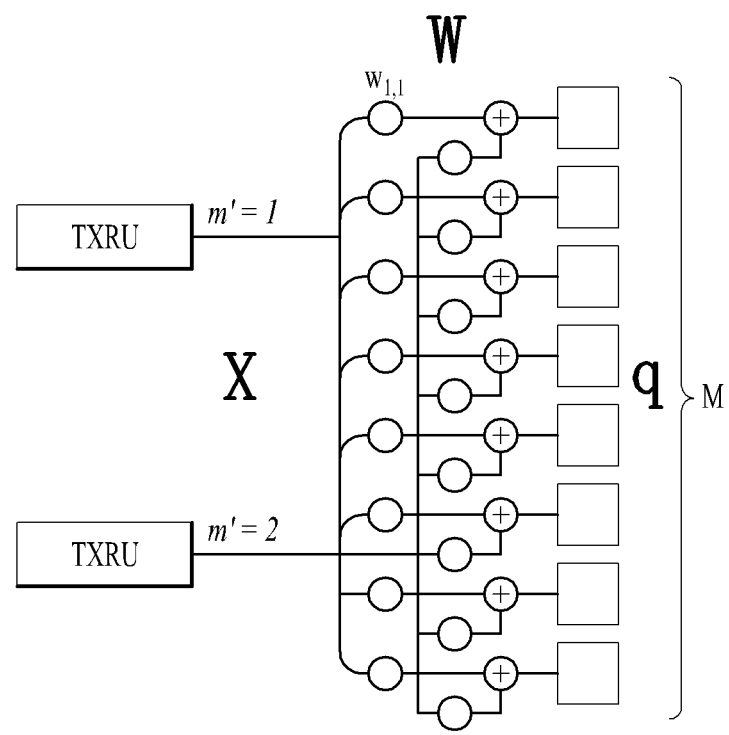

FIGS. 14 and 15 are diagrams illustrating representative methods for connecting TXRUs to antenna elements. Here, the TXRU virtualization model represents the relationship between TXRU output signals and antenna element output signals.

FIG. 14 shows a method for connecting TXRUs to sub-arrays. In FIG. 14, one antenna element is connected to one TXRU.

Meanwhile, FIG. 15 shows a method for connecting all TXRUs to all antenna elements. In FIG. 15, all antenna element are connected to all TXRUs. In this case, separate addition units are required to connect all antenna elements to all TXRUs as shown in FIG. 15.

In FIGS. 14 and 15, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 14 has a disadvantage in that it is difficult to achieve beamforming focusing but has an advantage in that all antennas can be configured at low cost.

On the contrary, the configuration shown in FIG. 15 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 16:
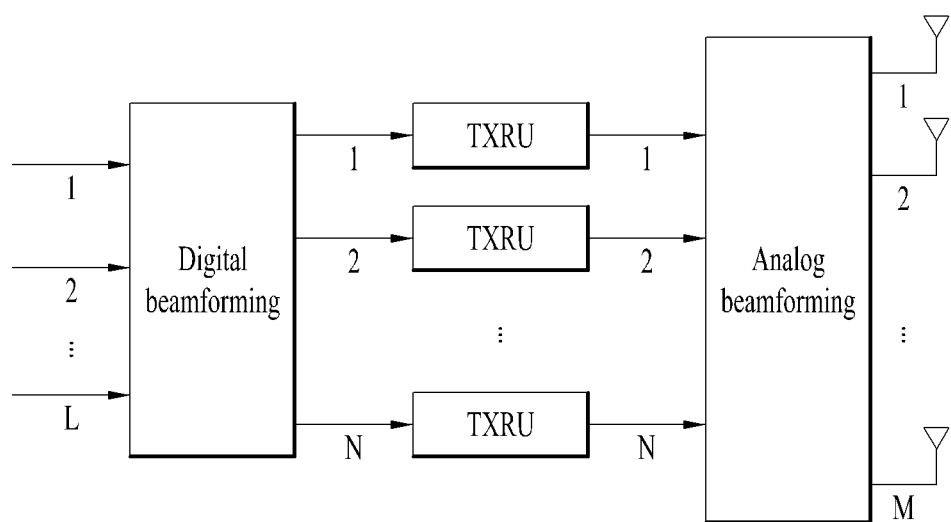
FIG. 16 is a schematic diagram illustrating a hybrid beamforming structure according to an embodiment of the present invention from the perspective of TXRUs and physical antennas.

FIG. 16 is a schematic diagram illustrating a hybrid beamforming structure according to an embodiment of the present invention from the perspective of TXRUs and physical antennas. In FIG. 16, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 17:
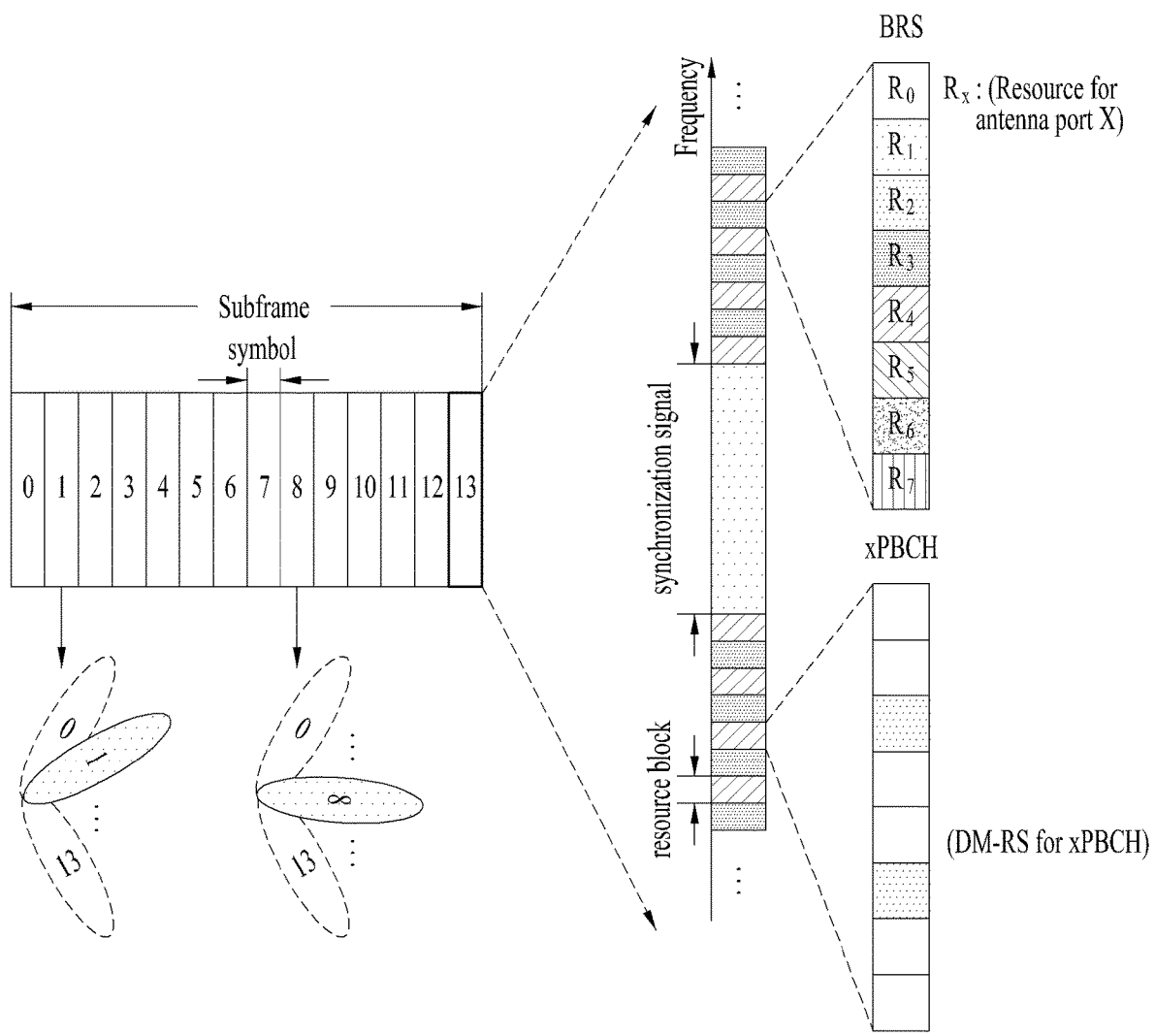
FIG. 17 is a diagram schematically illustrating the beam sweeping operation for synchronization signals and system information during a downlink (DL) transmission process according to an embodiment of the present invention.

FIG. 17 is a diagram schematically illustrating the beam sweeping operation for synchronization signals and system information during a downlink (DL) transmission process according to an embodiment of the present invention In FIG. 17, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

4. Proposed Embodiment

In the following description, operations of a UE and a base station (eNB) in an unlicensed band based on the above-described technical configuration will be described in detail.

As more and more telecommunication devices require greater communication capacity, efficient utilization of a limited frequency band in an upcoming wireless communication system is becoming an increasingly important requirement. Cellular communication systems such as LTE systems are also exploring ways to utilize unlicensed bands such as a 2.4-GHz band, which is commonly used by an existing Wi-Fi system, and an unlicensed band such as a 5-GHz band, which is newly attracting attention, for traffic offloading.

Basically, the unlicensed band is assumed to perform wireless transmission and reception through competition between communication nodes. Therefore, each communication node needs to perform channel sensing before transmitting a signal to confirm that other communication nodes do not transmit signals. Hereinafter, such an operation will be referred to as an LBT (listen before talk) or channel access procedure, for convenience of explanation. In particular, an operation for confirming whether or not another communication node performs signal transmission is referred to as carrier sensing (CS). Upon determining whether another communication node does not transmit a signal, this means that CCA (clear channel assessment) is confirmed.

An eNB or a UE of an LTE system should perform LBT in order to perform signal transmission in an unlicensed band (for convenience, referred to as LTE-U band or U-band). In addition, when the eNB or the UE of the LTE system transmits the signal, other communication nodes such as Wi-Fi perform LBT so as not to cause interference. For example, in the Wi-Fi standard (e.g., 801.11ac), a CCA threshold is set to −62 dBM with respect to a non-Wi-Fi signal and to −82 dBm with respect to a Wi-Fi signal. This means that, when a station (STA) or an access point (AP) senses a signal other than a Wi-Fi signal received with power of −62 dBM or more, the STA or the AP does not perform signal transmission in order to prevent interference.

As described above, since eNB DL or UE UL transmission in the unlicensed band may not always be guaranteed, an LTE UE operating in the unlicensed band may continuously be connected to another cell operating in a licensed band for stable control such as mobility or RRM.

In the present invention, for convenience, a cell, to which the UE is connected in an unlicensed band, is referred to as a U-cell (or LAA SCell) and a cell, to which the UE is connected in a licensed band, is referred to as an L-cell. A method of performing data transmission and reception in the unlicensed band together with the licensed band is referred to as licensed assisted access (LAA).

Basically, in the LTE system, transmission is performed in units of subframes having 1 ms. However, in the Rel-13 LTE LAA system, the concept of a partial subframe shorter than 1 ms was introduced in consideration of coexistence with the Wi-Fi system operating in the 5-GHz band.

More specifically, due to the characteristics of the unlicensed band, the eNB or the UE may attempt actual transmission after LBT has succeeded. If the start of transmission of the signal is allowed only in units of 1 ms, if the LBT success time and the subframe boundary do not coincide with each other, the eNB or the UE waits until the next subframe boundary and performs LBT again or transmits a signal for occupying the channel until the next subframe boundary. At this time, while the eNB or the UE waits until the next subframe boundary, another transmission node may occupy the channel first. Alternatively, if the eNB or the UE transmits the signal for occupying the channel, this may cause interference in other inter-node communication and may not help in improving system performance.

In order to solve such a problem, in addition to a subframe boundary, a slot boundary is additionally allowed as a point in time when the eNB or the UE can start actual transmission after LBT has succeeded.

Specifically, considering a subframe structure of an LTE system composed of two slots, a base station or a UE that successfully performs LBT is allowed to start signal transmission even at a subframe boundary or a second slot boundary. Therefore, if signal transmission starts at the second slot boundary, a partial subframe composed of only one slot is transmitted.

If transmission of consecutive subframes and partial subframes (and channel occupancy signals) is defined as Tx burst, there may be a regulation limiting the maximum transmission length of the Tx burst, transmission of which has started once, in the unlicensed band. Accordingly, if signal transmission starts in a partial subframe, it may be advantageous to attempt to transmit the signal in a partial subframe even in the last subframe of the Tx burst to suit the allowed maximum transmission length.

At this time, the first partial subframe of the Tx burst may be defined as an initial partial subframe, and the last partial subframe may be defined as an ending partial subframe. Accordingly, the ending partial subframe can be set to have the same structure as the DwPTS (Table 1 or Table 2) of the conventional TDD system.

In this case, a common PDCCH for transmitting information as shown in the following table may be transmitted as a method of indicating the number of symbols constituting the ending partial subframe. The common PDCCH can indicate the number of symbols constituting the current or next subframe and can be transmitted at an aggregation level of 4 or 8 or in correspondence with CCE (Control Channel Element) indices #0 to #3 or CCE indices #0 to #7.

TABLE 7

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

In addition, partial subframes for UL subframes were introduced in the LTE Rel-14 eLAA system. At this time, in the initial partial subframe, a structure in which the first one symbol is emptied or a part of the first one symbol is emptied was introduced. Specifically, a period of 25 μsec or 25 μsec+TA (timing advance) of the first one symbol may be emptied, and the remaining region of the first one symbol may be transmitted by extending the cyclic prefix (CP) of a second symbol. For the ending partial subframe, a structure for emptying the last one symbol was introduced. Whether there is a partial subframe of the UL subframe and which part is emptied may be signaled through a UL grant.

Hereinafter, for improvement of the performance of the LTE system or efficient coexistence with a Wi-Fi system, a method of transmitting corresponding partial subframes when more starting positions and ending positions than partial subframes allowed in Rel-13 LAA and Rel-14 eLAA are permitted will be described in detail.

4.1. DL Initial Partial Subframe 4.1.1. PDSCH Configuration Method

A point in time when an (E)PDCCH and/or a PDSCH may start is limited, but, when the (E)PDCCH and/or a PDSCH starts in the remaining points in time, some of subsequent symbols may be transmitted without change.

As an example, the point in time when the (E)PDCCH may start, such as the initial partial subframe allowed in the LTE Rel-13 LAA system, may be limited to each slot boundary (i.e. symbol #0 and symbol #7).

At this time, when DL transmission starts between symbol #1 to symbol #6 (or start may be allowed in only some of the symbols), some of the symbols included in the initial partial subframe to be transmitted in a second slot may be transmitted. In addition, when DL transmission starts between symbol #8 and symbol #13 (or start may be allowed in only some of the symbols)), some of the symbols to be transmitted in the next subframe may be transmitted.

For example, when DL transmission starts at symbol #4, a PDSCH transmitted in symbol #4/5/6 may be equal to a PDSCH transmitted in symbol #11/12/13 (at the previous stage of IFFT (Inverse Fast Fourier Transform), that is, in the frequency domain). In this case, DL signals (e.g., CRS (Cell-specific Reference Signal), CSI-RS (Channel State Information-Reference Signal), and DM-RS (Demodulation Reference Signal)) to be transmitted in symbol #4/5/6 may be equal to DL signals (e.g., CRS, CSI-RS and DM-RS) to be transmitted in #11/12/13 or DL signals (e.g., CRS, CSI-RS and DM-RS) to be transmitted in symbol #4/5/6 may be equal to signals to be transmitted in a first slot.

The above method is similarly applicable to the case where a particular symbol (e.g., symbol #4 and/or symbol #11) is added to each slot boundary as a point in time when the PDCCH may start.

In another example, the point in time when the (E)PDCCH may start is limited to a specific point in time (e.g., every slot boundary, i.e. symbol #0 and symbol #7) and, as the point in time when the PDSCH may start, a specific point in time (e.g., symbol #4 and/or symbol #11) may be allowed in addition to the point in time when the (E)PDCCH may start.

If DL transmission starts between symbol #1 to symbol #3 (or start may be allowed in only some of the symbols), some of the symbols belonging to the initial partial subframe to be transmitted starting from symbol #4 may be transmitted. Also, if DL transmission starts between symbol #5 and symbol #6 (or start may be allowed in only some of the symbols), some of the symbols belonging to the initial partial subframe to be transmitted in the second slot may be transmitted. Also, if DL transmission starts between symbol #8 and symbol #10 (or start may be allowed in only some of the symbols), some of the symbols belonging to the initial partial subframe to be transmitted starting from symbol #11 may be transmitted. In addition, when DL transmission starts between symbol #12 and symbol #13 (or start may be allowed in only some of the symbols), some of the symbols to be transmitted in the next subframe may be transmitted.

For example, when DL transmission starts at symbol #5, a PDSCH to be transmitted in symbol #5/6 is equal to a PDSCH to be transmitted in symbol #12/13 (at the front stage of the IFFT, that is, in the frequency domain). DL signals (e.g., CRS, CSI-RS and DM-RS) to be transmitted in symbol #5/6 may be equal to DL signals (e.g., CRS, CSI-RS and DM-RS) to be transmitted in symbol #12/13 or DL signals (e.g., CRS, CSI-RS and DM-RS) to be transmitted in symbol #5/6 may be equal to signals to be transmitted in a first slot.

The above method is advantageous in that, even if actual DL transmission is allowed for each symbol, some symbols previously created (or preset) can be reused and thus PDSCH configuration complexity can be reduced from the viewpoint of eNB transmission.

4.1.2. PDSCH Start Time Point Indication Method

The base station may signal the start symbol index of a PDSCH through DCI scheduling an actual PDSCH. Alternatively, the eNB may commonly transmit the start symbol index of the PDSCH to a cell (or a UE group) through common (or UE-group common) DCI on the corresponding LAA SCell.

In this case, an actually signaled value may be an offset value between the PDSCH start symbol index and the PDCCH start symbol index, to which the DCI belongs. For example, when transmission of the PDCCH starts from symbol #7, but the PDSCH start symbol index is symbol #3, a value of 4 may be signaled through the DCI. When the above signal is transmitted through the common (or UE-group common) DCI on the LAA SCell, the signal may be transmitted in the CCE after CCE index #7 considering the already configured common PDCCH.

4.1.3. Method of Configuring Reference Subframe for Adjusting Contention Window Size (CWS) for Initial Partial Subframe In an LTE Rel-13 LAA system, HARQ-ACK feedback corresponding to a reference subframe is used to adjust a CWS.

In general, the reference subframe is defined as a first subframe of a Tx burst. If the corresponding subframe is an initial partial subframe, a next full subframe is also defined as a reference subframe, considering that the successful reception probability of the corresponding partial subframe cannot be guaranteed.

However, if initial partial subframes having various lengths are allowed, the definition of the reference subframe may vary depending on the length of the initial partial subframe.

For example, for an initial partial subframe composed of X symbols or fewer (e.g., X=7), the initial partial subframe and a next full subframe thereof are defined as a reference subframe and, for an initial partial subframe composed of greater than X symbols, only the initial partial subframe may be defined as a reference subframe.

4.1.4. Restrictions on Initial Partial Subframe

In the case of an initial partial subframe, in which an (E)PDCCH starts after a specific symbol index, there may be a constraint that there is no DL assignment for scheduling DL data for the (E)PDCCH. For example, if the initial partial subframe composed of three symbols from symbol #11 is allowed, it is difficult for the initial partial subframe to have sufficient resources to carry the PDCCH. Therefore, PDSCH and DL assignment and/or EPDCCH may not be configured for the corresponding subframe.

In the initial partial subframe, a UL grant may be allowed. At this time, when the UL grant is transmitted through the PDCCH after the specific symbol index, a constraint that the timing of the PUSCH subframe in which the UL grant may be scheduled is "after at least 5 msec.

Generally, delay from the UL grant to the PUSCH is set to 4 msec in consideration of a time budget such as PDCCH decoding/TA (Timing Advance)/PUSCH processing. Since the end time point of the PDCCH in the initial partial subframe is near the subframe ending boundary, the time budget may not be sufficient with delay of 4 msec. The value of a field indicating the PUSCH timing on the UL grant for LAA SCell in the initial partial subframe is reinterpreted to be increased by 1 msec or the UE may not expect to indicate 4 msec in the corresponding field. Alternatively, 4 msec may be allowed to be indicated as the PUSCH timing on the UL grant according to UE capability (e.g., separate UE capability may be defined, in the case of the EPDCCH-capable UE).

In the case of the initial partial subframe, in which the (E)PDCCH starts after the specific symbol index, the PDCCH may be configured up to the last symbol index in order to minimize dummy signal transmission. For example, if the initial partial subframe composed of three symbols from symbol #11 is allowed, the PDCCH may be constrained to be always composed of three symbols. In this case, a PCFICH may not be transmitted or, even when the PCFICH is transmitted, the UE may expect only the PCFICH for signaling that the PDCCH region is composed of three symbols.

Alternatively, in the case of the initial partial subframe (which is, for example, composed of three symbols from symbol #11), in which the (E)PDCCH starts after the specific symbol index, DL data scheduled in DL assignment on the corresponding (E)PDCCH may be present on the next full subframe and the initial symbol of the corresponding DL data may be set to symbol #0 (or symbol #1 or symbol #2).

Alternatively, in the case of the initial partial subframe, in which the (E)PDCCH starts after the specific symbol index, the UE which has received DL data in (DL) assignment on the (E)PDCCH may assume that the PDCCH is not present in the current subframe or is present just before the starting symbol of the DL data (the starting symbol of the DL data is set to symbol #1 or symbol #2).

4.1.5. EPDCCH Starting Symbol Definition Method

In an LTE Rel-13 LAA system, a starting symbol index of the EPDCCH composed of a second slot is determined by applying a symbol offset value from a subframe boundary criterion set by higher layer signaling based on a second slot boundary.

For example, if the starting symbol index of the EPDCCH is set to symbol #2 by higher layer signaling based on the full subframe, the starting symbol index of the EPDCCH composed of only the second slot may be reinterpreted as symbol #2+7.

If a reference DL starting position is allowed in addition to the slot boundary, the starting symbol index indicated based on the additionally set reference DL starting position may be reinterpreted using the same method. For example, if the DL starting partial SF starting at symbol #4 is allowed, the starting symbol index of the EPDCCH may be set to symbol #2 by higher layer signaling based on the full subframe. At this time, the EPDCCH starting symbol index at the corresponding DL starting partial subframe may be reinterpreted as symbol #2+4.

Alternatively, even when the DL starting partial subframe starts between symbol # and symbol #7, the EPDCCH may be configured equally to the EPDCCH configured in the DL starting partial subframe composed of only the second slot.

In another method, when the additional (reference) DL starting position is allowed in addition to the slot boundary, the EPDCCH may be predefined (or configured by separate signaling) based on the additional (reference) DL starting position regardless of the starting symbol index of the pre-configured EPDCCH. For example, if the DL starting partial subframe starting at symbol #4, the EPDCCH starting symbol index in the corresponding DL starting partial subframe may be predefined as symbol #X+4 (for example, X=1) or the X value may be set by higher layer signaling or L1 signaling, regardless of the starting symbol index of the EPDCCH configured by higher layer signaling based on the full subframe.

4.1.6. PDCCH Mapping Method

In an LTE system, DM-RSs are transmitted in symbol #5/6 and symbol #12/13 (in the normal CP case). If a PDCCH starting from symbol #4 (or symbol #3) is introduced and the length of the PDCCH is 2 or more symbols (or three or more symbols), the PDCCH may be transmitted even in the symbols in which the DM-RS is transmitted.

In this case, in determination of the RE of the resource element group (REG) configuring the PDCCH, a rule may be established to exclude a DM-RS RE.

Figure 18:
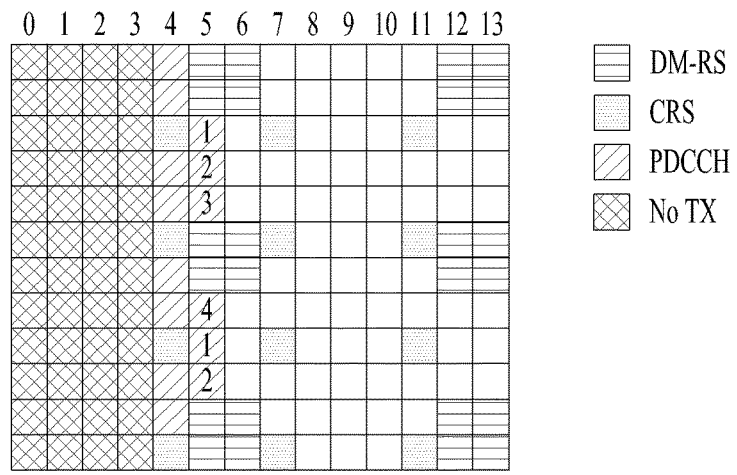
FIG. 18 is a diagram illustrating a PDCCH mapping method proposed by the present invention.

FIG. 18 is a diagram illustrating a PDCCH mapping method proposed by the present invention.

As shown in FIG. 18, when the PDCCH is transmitted in symbol #5, the DM-RS RE may be skipped and 1/2/3/4 REs may configure one REG. The same rule may be equally applied to a PDCCH starting from symbol #11 (or symbol #10).

4.2. DL Ending Partial Subframe

As described above, in an LAA system, as shown in Table 7, 4-bit information is used to signal the number of symbols configuring the current or next subframe through a common PDCCH. At this time, as shown in Table 7, "1110" and "1111" are currently empty in a reserved state.

4.2.1. Method of Indicating Length of Additional Ending Partial Subframe Using Reserved State For example, the eNB may set the length of one additional (UE-common, UE-group-common or UE-specific) ending partial subframe through higher layer signaling and indicate whether the ending partial subframe is a current subframe or a next subframe.

If A (e.g., 13) symbol ending partial subframes are added by higher layer signaling, (–, A) (that is, a next subframe is an ending partial subframe composed of A symbols) is indicated through "1110" (or "1111") and (A, –) (that is, a current subframe is an ending partial subframe composed of A symbols) may be indicated through "1111" (or "1110").

4.2.2. Method of Increasing Bit-Width of Field for "Subframe Configuration for LAA"

In Table 7 above, the bit-width of the field for "Subframe configuration for LAA" includes 4 bits to indicate up to 16 states.

As shown in Table 7, since the number of states, which may indicate the additional ending partial subframe information, among the 16 states, that is, the number of reserved states, is only 2, there is a limit in indicating the additional ending partial subframe information using the reserved states. Therefore, in the present invention, a configuration indicating the length of the added ending partial subframe using the increased number of states by increasing the bit-width of the corresponding field to 5 bits is proposed.

4.2.3. Method of Indicating RS Pattern of Subframe Through Common PDCCH and Indicating Actual PDSCH Length Through DCI For example, by signaling "1000" through a common PDCCH in SF #n, it is possible to indicate that the length of SF #n is 12 symbols and to indicate that the actual PDSCH transmitted in SF #n is composed of 13 symbols through the DCI.

At this time, in order to minimize the bit-width of the DCI field indicating the number of PDSCH symbols (or the ending symbol index), the number of symbols configuring the actual PDSCH may be combined with common PDCCH information to be signaled. Specifically, the value signaled through the DCI may be a difference between the number of symbols configuring the actual PDSCH and the number of symbols transmitted through the common PDCCH.

Alternatively, the value signaled through the DCI may be differently interpreted according to the number of symbols transmitted through the common PDCCH. For example, when "1101" is signaled through the common PDCCH of SF #n, the PDCCH length candidates which may be indicated through the DCI of SF #n is 4/5 symbols. As another example, when "1100" is signaled through the common PDCCH of SF #n, the PDCCH length candidates which may be indicated through the DCI of SF #n is 6/7/8 symbols. As another example, when "1000" is signaled through the common PDCCH of SF #n, the PDCCH length candidates which may be indicated through the DCI of SF #n are 12/13 symbols.

The above-described rule may be applied between the common PDCCH transmitted in SF #n−1 (to indicate the length of the next subframe) and the DCI transmitted in SF #n.

4.3. UL Initial Partial Subframe

Figure 19:
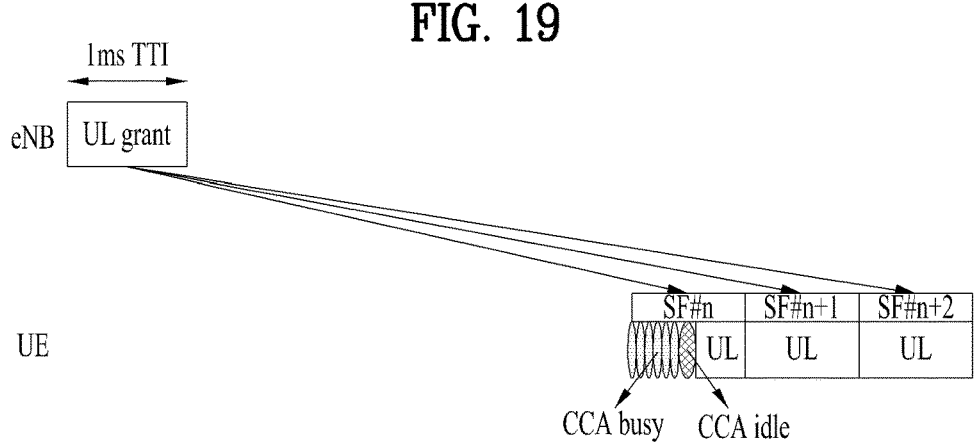
FIG. 19 is a diagram illustrating a configuration in which an unlicensed band is scheduled through a UL grant according to an example of the present invention.

FIG. 19 is a diagram illustrating a configuration in which an unlicensed band is scheduled through a UL grant according to an example of the present invention.

As shown in FIG. 19, if UL data is scheduled on SF #n to SF #n+2 by multi-subframe scheduling, even when the UE has not successfully performed LBT at the start boundary of SF #n, start of UL data transmission at the other time points may be allowed. In this case, the probability that the UE occupies the channel is proportional to UL performance. Accordingly, a method of allowing several starting positions with respect to a UL subframe of an unlicensed band will be described in detail.

4.3.1. Method of Indicating Length of UL Initial Partial Subframe from the Viewpoint of eNB Considering that scheduling based UL transmission is preferable, the eNB may signal initial candidate time points of the subframe through a UL grant (or higher layer signaling).

The UL grant supported in the Rel-14 eLAA system may indicate that PUSCH transmission starts at one of the following time points (for convenience, referred to as legacy time points).

Symbol 0 boundary
Symbol 0 boundary+25 µsec
Symbol 0 boundary+25 µsec+TA
Symbol 1 boundary Additionally, considering that LBT which may be transmitted at the corresponding point in time may fail, the eNB may signal that UL transmission may start at the other points in time. Specifically, the eNB may indicate candidate start time points through the UL grant (or higher layer signaling) as information indicating that UL transmission may start at a certain time point other than the legacy time point.

Here, the candidate start time points may include at least the following time points. At this time, the corresponding candidates may be restrictively and differently set according to UE capability (e.g., some of candidates available by UE capability signaling).

all time points (or some thereof) after indication through the UL grant among the four time points (or legacy time points)

2nd slot boundary
every symbol boundary
even-numbered (or odd-numbered) symbol boundary
time point when the PUSCH supported in UpPTS may start As described above, if the legacy time points and time points being able to start transmission considering failure of LBT are additionally indicated through the UL grant (or higher layer signaling), the two signals may be associated with each other. For example, if symbol 0+25 µsec (+TA) is indicated as the legacy time point and a second slot boundary is indicated as an additional candidate (time point), when LBT does not succeed at the legacy time point, the UE may perceive second slot boundary+25 µsec (+TA) as a new start time point candidate.

Alternatively, the two signals may not be associated with each other. This is because, when the UE fails LBT at the legacy time point, the legacy time point is no longer useful considering that the legacy time point is useful when UL transmission just after a full DL subframe is scheduled. For example, if symbol 0+25 µsec (+TA) is indicated as the legacy time point and the second slot boundary is indicated as an additional candidate (time point), when LBT does not succeed at the legacy time point, the UE may perceive the second slot boundary as a new start time point candidate regardless of the indicated legacy time point.

As described above, considering that the UE may fail in LBT for signal transmission at the legacy time point, the eNB may inform the UE that signal transmission may start even at the other time points (candidate start time points may be indicated through the UL grant (or higher layer signaling) as information on when signal transmission may start). However, change in UL transmission time point according to the LBT result upon actual UL implementation may not be preferable.

In view of this, the UL start time point (for convenience, referred to as a new time point) other than the legacy time point may be indicated through the UL grant and a method of indicating the new time point may be associated with signaling of the legacy time point.

For example, if the new time point is indicated by a symbol boundary and the legacy time point is indicated by +25 µsec (or +25 µsec+TA), the signaling may be interpreted as indicating a time point delayed by +25 µsec (or +25 µsec+TA) from the new time point.

TABLE 8

| Value | Symbol X |
|---|---|
| 00 | X = A (e.g., 8) |
| 01 | X = B (e.g., 9) |
| 10 | X = C (e.g., 10) |
| 11 | X = D (e.g., 11) |

TABLE 9

| Value | PUSCH starting position |
|---|---|
| 00 | symbol X |
| 01 | 25 µs in symbol X |
| 10 | (25 + TA) µs in symbol X |
| 11 | symbol X + 1 |

Specifically, as shown in Tables 8 and 9, a field indicating a gap between the position of symbol X and an actual UL start time point may be separately defined. At this time, the field indicating symbol X may include 3 bits and may be set to indicate more information than Table 8. Alternatively, the field indicating symbol X includes 1 bit and may be set to indicate a first slot boundary or a second slot boundary. Alternatively, in Table 8, values A, B, C and D may be predefined or signaled by higher layer signaling in a UE-specific (or UE-group-common or cell-common) manner.

For example, if "01" is signaled in the symbol X field and "10" is signaled in the PUSCH starting position field, the UE may start UL transmission when LBT succeeds from a time point of symbol 9+25 μsec+TA.

Information indicating the symbol X may be indicated by an explicit field as shown in Table 8 or may be implicitly indicated by being combined with the field indicating a DMRS orthogonal cover code (OCC)/cyclic shift (CS) index. For example, a rule may be established such that, if the DMRS CS index on the UL grant is 5 or less, this means X=0 of Table 8 and, if the DMRS CS index is 6 or more, this means X=7.

Alternatively, the existing "PUSCH starting position" field is not reused and instead a new field may be used to apply a method of indicating an actual PUSCH starting position.

For example, the new field may be configured as shown in the following table. At this time, the field indicating the symbol X may include 5 bits. Alternatively, the values A, B, C, D and E of the following table may be predefined or set by higher layer signaling in a UE-specific (or UE-group-common or cell-common) manner.

TABLE 10

| Value | PUSCH starting position |
|---|---|
| 0000 | symbol A (e.g., 0) |
| 0001 | 25 μs in symbol A |
| 0010 | (25 + TA) μs in symbol A |
| 0011 | symbol B (e.g., 9) |
| 0100 | 25 μs in symbol B |
| 0101 | (25 + TA) μs in symbol B |
| 0110 | symbol C (e.g., 10) |
| 0111 | 25 μs in symbol C |
| 1000 | (25 + TA) μs in symbol C |
| 1001 | symbol D (e.g., 11) |
| 1010 | 25 μs in symbol D |
| 1011 | (25 + TA) μs in symbol D |
| 1100 | symbol E (e.g., 12) |
| 1101 | 25 μs in symbol E |
| 1110 | (25 + TA) μs in symbol E |
| 1111 | Reserved |

The UL initial partial subframe according to the above-described method may be suitable when short LBT such as a Type-2 channel access procedure (e.g., an LBT method capable of accessing a channel upon determining that the channel is idle only during a predetermined time (25 μsec)) is performed after a DL (and/or UL) ending partial subframe to attempt signal transmission.

However, when the UE transmits a UCI only PUSCH without a UL-SCH, the above-described UL initial partial subframe may not be applied.

The method of allowing start of transmission at the other time points if LBT for signal transmission at the legacy time point fails as described above may be defined as Mode 1 transmission and the method of indicating the UL start time point other than the legacy time point (that is, the new time point) through the UL grant as described above may be defined as Mode 2 transmission.

At this time, the eNB may inform a specific UE of whether Mode 1 transmission and/or Mode 2 transmission is allowed through RRC signaling. Alternatively, the eNB may inform the UE of whether Mode 1 transmission and/or Mode 2 transmission is allowed by the DMRS OCC/CS value on the UL grant. For example, if the DMRS CS value is 5 or less, this means Mode 1 transmission and, if the DMRS CS value is 6 or more, this means Mode 2 transmission.

4.3.2. Method of Perceiving Length of UL Initial Partial Subframe from the Viewpoint of eNB As described above, if the candidates of the PUSCH start time point are indicated through the UL grant or start of signal transmission at the time point (e.g., the second slot boundary and/or every symbol boundary and/or even-numbered (or odd-numbered) symbol boundary) other than the time point indicated through the UL grant is allowed, the UE may inform the eNB of the actual start time point of the PUSCH in order to increase reception complexity and reception success probability of the eNB.

For example, the UE may signal the actual start time point of the PUSCH by changing the transmitted DM-RS sequence, the DM-RS transmission symbol index and/or the comb index of the DM-RS transmission symbol according to the actual PUSCH start time point.

More specifically, as described in Chapter 4.3.1, when the eNB signals the candidates of the PUSCH start time point through the UL grant, the DM-RS sequence of each candidate (or common to the candidates) may be indicated through the UL grant (or higher layer signaling). Then, the UE may transmit the pre-indicated DM-RS sequence (common to the candidates) in the corresponding subframe according to the PUSCH start time point. Alternatively, the UE may transmit the DM-RS sequence determined by a preset rule in the corresponding subframe according to the PUSCH start time point.

Alternatively, the UE may signal the actual PUSCH start time point through the corresponding initial partial subframe using a UCI piggyback method. As the UCI piggyback method, (1) a method of configuring coded bits through separate coding or joint coding with rank indicator (RI) information and transmitting the corresponding information in a symbol carrying the RI information, (2) a method of puncturing a PUSCH using a symbol capable of carrying HARQ-ACK information and then transmitting the corresponding information and (3) a method of configuring coded bits through separate coding or joint coding with channel state information (CSI), performing PUSCH rate matching and then transmitting the corresponding information are applicable.

If the DM-RS sequence is changed and transmitted according to the PUSCH starting symbol index in the corresponding initial partial subframe or information on the PUSCH start time point is transmitted by a UCI piggyback method, there is a difficulty in directly applying the above operation to the corresponding subframe.

In order to solve this problem, the method of differentiating the DM-RS sequence or transmitting the corresponding information using the UCI piggyback method by the UE is applicable to the next scheduled subframe (that is, the UE may differentiate the DM-RS sequence or transmit the corresponding information to the eNB through UCI piggyback in the next scheduled subframe).

In this case, when the next scheduled subframe is moved away from the initial partial subframe, the corresponding information may not be useful. Accordingly, the above-described methods are applicable only when additional scheduled subframes are within Y subframes from the initial partial subframe.

Characteristically, the above-described methods are applicable only when consecutive subframes are scheduled by multi-subframe scheduling DCI. For example, as shown in FIG. 19, a plurality of subframes is scheduled by multi-subframe scheduling DCI from SF #n to SF #n+2 and Symbol 0 boundary+25 μsec is indicated as the PUSCH starting position, even when the UE fails in LBT, the subframe in which PUSCH transmission may be attempted at the time point other than Symbol 0 boundary+25 μsec may be restricted to SF #n and SF #n+1.

The above-described configurations will be described more generally. Only when a PUSCH starting from a subframe boundary is scheduled in a next subframe from the viewpoint of the UE, PUSCH transmission may be allowed at a time point other than the legacy time point (or a specific length (e.g., 7 symbols) or shorter) in the current subframe. Alternatively, only when the PUSCH composed of the full subframe is scheduled in the next subframe from the viewpoint of the UE, PUSCH transmission may be allowed at a time point other than the legacy time point in the current subframe.

4.3.3. Subframe in which Aperiodic CSI Feedback is Triggered

When aperiodic CSI feedback is triggered in SF #n, transmission of a signal having an initial partial subframe structure by a specific UE may not be allowed for stable transmission of CSI information.

4.3.4. Method of Configuring UL Initial Partial Subframe from the Viewpoint of UE When the length of the initial partial subframe may be changed according to the LBT result, the corresponding initial partial subframe may be configured as follows.

In a state of determining PUSCH resource mapping regardless of the LBT result, when some symbols may not be transmitted due to the LBT result, the corresponding initial partial subframe is configured through puncturing (Opt 1)

When some symbols may not be transmitted due to the LBT result, rate matching is performed in consideration of the shortened length of the subframe to configure the corresponding initial partial subframe (Opt 2)

The UE may provide information on which of the two options is supported to the eNB through UE capability signaling. The eNB, which has received such UE capability, may configure which of the two options is applied through higher layer signaling or L1 signaling.

At this time, when the UE performs rate matching, a plurality of modulation and coding scheme (MCS) values may be indicated through the UL grant to set the MCS value changed according to the starting position of the initial partial subframe. For example, if the specific MCS value and the MCS offset value are indicated through the UL grant (or the specific MCS value is indicated through the UL grant and the MCS offset value is indicated through higher layer signaling), the UE may apply the specific MCS value to the transmitted signal when the UE transmits a PUSCH at the legacy time point and apply the MCS offset value to the specific MCS value to perform rate matching when the PUSCH is transmitted in the second slot boundary according to the LBT result.

When the length of the initial partial subframe may be changed according to the LBT result, the UE may perform puncturing or rate matching in order to transmit a signal (e.g., PUSCH) in the initial partial subframe. However, when the code rate of the signal is greater than a specific code rate (e.g., 0.93), the UE may not attempt PUSCH transmission.

At this time, different UE operations may be defined as follows depending on whether the transmission block (TB) is initially transmitted or retransmitted.

For example, in the case of initial transmission, the UE may not attempt PUSCH transmission when the code rate of the specific signal is greater than the specific code rate (e.g., 0.93). In contrast, in the case of retransmission, the UE may attempt PUSCH transmission regardless of the code rate.

Alternatively, when rate matching is performed, if the code rate of the signal is greater than a specific code rate (e.g., 0.93), the UE may decrease the code rate using a higher modulation order than the MCS indicated through the UL grant. For example, when the modulation order is increased, the UE may apply a minimum modulation order less than the specific code rate (e.g., 0.93).

In transmission of 2TBs (or codewords (CWs)), a rule different from that of the above-described configuration may be set.

2-TB transmission may be performed using multiple antennas/ports of the UE operating in transmission mode (TM) 2. When 2-TB transmission is performed and PUSCH transmission does not start at the legacy time point and starts at another time point (e.g., second slot boundary) due to LBT failure of the UE, the UE may abandon transmission of one specific TB and attempt only transmission of the remaining one TB, thereby preventing the code rate from being increased with the two TBs.

At this time, a TB having a small (or large) transmission block size (TBS) between two scheduled TBs may be selectively transmitted, the retransmitted (or initially transmitted) TB may be selectively transmitted, or the first (or second) TB may be selectively transmitted in the UL grant.

In the LTE system, to which the present invention is applicable, mapping of one codeword to at most two layers is supported and thus the above operation may be allowed only in 2-layer transmission.

Alternatively, in the case of 1-TB transmission, signal transmission in which the length of the initial partial subframe is changed according to the LBT result is not allowed. However, in the case of 2-TB transmission, PUSCH transmission in which the length of the initial partial subframe is changed according to the LBT result may be allowed.

Alternatively, different UE operations may be defined depending on whether each TB is initially transmitted or retransmitted. For example, when the two TBs are initially transmitted, the UE separately transmits the TBs or selects and transmits only one TB. When only one TB is retransmitted, the UE may select and transmit only one TB according to the above-described rule. In addition, when the two TBs are retransmitted, the UE may separately transmit the TBs or select and transmit only one TB.

4.3.5. Reference Subframe Configuration Method for (CWS) Adjustment of Initial Partial Subframe In the Rel-14 eLAA system, a first subframe (including a UL-SCH) actually transmitted by a UE is set as a reference subframe, the UE increases a CWS value for every priority class whenever the UE sends a new UL burst until a new data indicator (NDI) of the reference subframe is toggled and resets the CWS value of every priority class when the NDI of the reference subframe is toggled. At this time, the reference subframe may be defined as a subframe, in which a signal is first transmitted, in the UL burst due to success of random backoff based LBT (e.g., Type 1 channel access procedure) starting earlier than the subframe (e.g., SF #n+3) after three subframes from a time point (e.g., SF #n) when the UE has received the UL grant.

If the UL initial partial subframe starting at a time point other than the legacy time point or having a specific length or shorter (e.g., 7-symbol duration) is specified as a reference subframe, the reception success rate of the corresponding subframe may be significantly low. Therefore, the corresponding partial subframe may not be specified as the reference subframe. Instead, in this case, a subframe located after the corresponding partial subframe may be defined as a reference subframe.

However, when the code rate of the UL initial partial subframe is greater than the specific value (e.g., 0.93), the UL initial partial subframe is not defined as a reference subframe and, when the code rate of the UL initial partial subframe is equal to or less than the specific value (because reception success may be guaranteed), the UL initial partial subframe is defined as a reference subframe. At this time, the specific value of the code rate may be set by higher layer signaling or L1 signaling. The code rate based configuration is equally applicable to the full subframe in addition to the initial partial subframe.

Alternatively, whether a specific UL initial partial subframe is set as a reference subframe may be differently defined depending on whether the UE performs rate matching or puncturing with respect to the specific UL initial partial subframe. For example, when the UE performs puncturing with respect to the UL initial partial subframe, the UL initial partial subframe may not be defined as a reference subframe. In contrast, when the UE performs rate matching with respect to the UL initial partial subframe, the UL initial partial subframe may be defined as a reference subframe.

Alternatively, whether a specific UL initial partial subframe is set as a reference subframe may be differently defined depending on whether the TB included in the UL initial partial subframe is initially transmitted or retransmitted. For example, in the case of initial transmission, the UL initial partial subframe may not be defined as a reference subframe. In contrast, in the case of retransmission, the UL initial partial subframe may be defined as a reference subframe. More specifically, even in the case of retransmission, when initial transmission (and/or retransmission) of the TB is performed in the UL initial partial subframe starting at a time point other than the legacy time point or having a specific length or shorter (e.g., 7-symbol duration), the UL initial partial subframe may not be defined as a reference subframe.

Alternatively, whether a specific UL initial partial subframe is set as a reference subframe may be differently defined according to a redundancy version (RV) indicated in the TB included in the specific UL initial partial subframe. For example, when the RV value is 0, the UL initial partial subframe may not be defined as a reference subframe. In contrast, when the RV value is a value other than 0, the UL initial partial subframe may be defined as a reference subframe.

When there is no subframe continuous to the UL initial partial subframe (or if there is a subframe continuous to the UL initial partial subframe but there is only a partial SF having a specific length or shorter (e.g., 13 symbols)), if the UL initial partial subframe is not defined as a reference subframe, there may not be reference subframe in the UL burst. In this case, the CWS value corresponding to every priority class may be maintained.

Alternatively, as described above, when a method of allowing start of signal transmission at another time point despite failure of LBT which may be transmitted at the legacy time point is defined as Mode 1 transmission, not only the initial partial subframe but also a subsequent subframe may be defined as a reference subframe with respect to the UE operating in Mode 1 transmission. Hereinafter, a CWS adjustment method will be described in detail.

(1) First Method

If a UL grant is received in SF #n and a reference subframe of a UL burst starting at SF #n−3 is an initial partial subframe corresponding to Mode 1 transmission and the next subframe thereof, assume that a HARQ process index corresponding to the initial partial subframe corresponding to Mode 1 transmission is defined as ref_1 and a HARQ process index corresponding to the next subframe is defined as ref_2.

The UE may receive PUSCHs corresponding to ref_1 and ref_2 scheduled in the UL grant received in SF #n (or in the UL grant for scheduling a continuous UL burst without a gap from a UL SF scheduled in SF #n), reset the CWS only when the NDI is toggled with respect to all the PUSCHs, and increase the CWS corresponding to every priority class in the other cases. In other words, if the PUSCH corresponding to ref_1 or ref_2 in the UL grant (or in the UL grant for scheduling a continuous UL burst without a gap from a UL SF scheduled in SF #n) is not scheduled or if scheduling is performed but the NDI is not toggled with respect to one of the PUSCHs, the UE may increase the CWS.

(2) Second Method

If a UL grant is received in SF #n and a reference subframe of a UL burst starting at SF #n−3 is an initial partial subframe corresponding to Mode 1 transmission and a next subframe thereof, assume that a HARQ process index corresponding to the initial partial subframe corresponding to Mode 1 transmission is defined as ref_1 and a HARQ process index corresponding to the next subframe is defined as ref_2.

The UE may receive a PUSCH corresponding to at least one of ref_1 and ref_2 scheduled in the UL grant received in SF #n (or in the UL grant for scheduling a continuous UL burst without a gap from a UL SF scheduled in SF #n), reset the CWS only when the NDI is toggled with respect to at least one of ref_1 or ref_2, and increase the CWS corresponding to every priority class in the other cases. In other words, if both the PUSCHs corresponding to ref_1 and ref_2 in the UL grant (or in the UL grant for scheduling a continuous UL burst without a gap from a UL SF scheduled in SF #n) are not scheduled, if scheduling of both the PUSCHs corresponding to ref_1 and ref_2 is performed but both the NDIs corresponding to ref_1 and ref_2 are not toggled, or if scheduling of any one of the PUSCHs corresponding to ref_1 and ref_2 is performed but the NDI corresponding to scheduled ref_1 or ref_2 is not toggled, the UE may increase the CWS. More specifically, when ref_1 and ref_2 are not scheduled in a next transmission burst, the CW may be increased. Alternatively, when only ref_1 is scheduled and ref_2 is not scheduled, if (scheduled) ref_1 is not toggled, the CWS may be increased. Alternatively, when only ref_2 is scheduled and ref_1 is not scheduled, if (scheduled) ref_1 is not toggled, the CWS may be increased.

At this time, when the UL grant is received in SF #n, the first subframe of the UL burst starting in SF #n−3 may be an initial partial subframe corresponding to Mode 1 transmission but the next subframe may not be a subframe located at SF #n−3. For example, if the initial partial subframe corresponding to Mode 1 transmission is SF #n, the next full subframe is SF #n−3, and a subframe in which the UL grant is received is SF #n, the UE may regard only the initial partial subframe corresponding to Mode 1 transmission as a reference subframe (Opt. 1) or find a reference subframe in the UL burst preceding the corresponding UL burst (Opt. 2).

4.4. UL Ending Partial Subframe

4.4.1. Method of Indicating the Length of UL Ending Subframe from the Viewpoint of eNB The eNB may indicate the number of symbols configuring a UL ending partial subframe through the UL grant.

Alternatively, the eNB may implicitly indicate the last symbol index of the UL ending partial subframe using a field indicating a DMRS OCC/CS index. For example, the DMRS CS index in the UL grant set to 5 or less may mean that the last symbol index of the UL ending partial subframe is symbol #6.

Alternatively, the eNB may implicitly or explicitly inform the UE of the number of symbols configuring the UL ending partial subframe (or the last symbol index) through a common PDCCH (or a separate UL grant).

For example, when the eNB indicates not only the starting position of the corresponding subframe but also the period of the UL burst and the channel occupancy time of the eNB through the common PDCCH, the UE may perceive the ending position of the subframe transmitted in the last period of the UL burst through a combination of the two pieces of information.

As another example, when the starting position of the corresponding subframe may be perceived through the symbol index in which the common PDCCH is found, the eNB may signal the period of the UL burst and the channel occupancy time of the eNB through the common PDCCH transmitted in the corresponding subframe and the UE may perceive the ending position of the subframe transmitted in the last period of the UL burst through a combination of the two pieces of information.

For example, if the starting position of the corresponding subframe is indicated as symbol #m through the common PDCCH and the period of the UL burst and the channel occupancy time of the eNB are indicated as SF #K through the common PDCCH transmitted in the corresponding subframe, the ending position of the UL subframe to be transmitted in SF #K may be set to symbol #(13-m) through the combination of the two pieces of information. Alternatively, if the channel occupancy time of the eNB is up to SF #K and the PUSCH is not scheduled in SF #K+1 or scheduling is performed but there is a gap for LBT, the UE may perceive the last subframe boundary of SF #K as an ending position.

Figure 20:
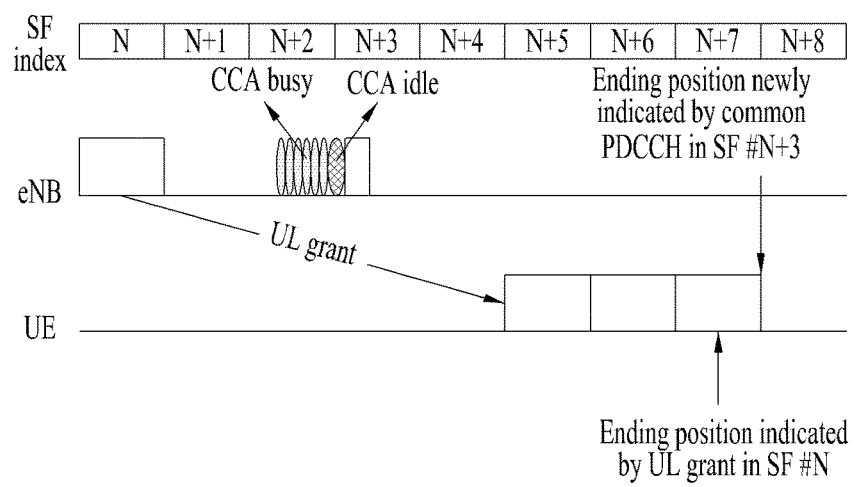
FIG. 20 is a diagram illustrating operation according to an example of the present invention.

FIG. 20 is a diagram illustrating operation according to an example of the present invention.

As shown in FIG. 20, three consecutive subframes such as SF #N+5 to SF #N+7 may be scheduled through multi-subframe DCI transmitted in SF #N and the ending symbol index of SF #N+7 may be indicated as 12. At this time, when the eNB acquires (or secures) a channel in SF #N+3 and signal transmission is possible until the last symbol of SF #N+7 due to a large maximum channel occupancy time, the eNB may (explicitly or implicitly) signal the ending position of SF #N+7 by the common PDCCH (or a separate UL grant) of SF #N+3. The UE, which has received this signal, may perform UL data transmission based on the information received from the common PDCCH (or the separate UL grant) transmitted in SF #N+3, instead of the UL grant transmitted in SF #N.

4.4.2. DM-RS Transmission Method

In the UL subframe, a DM-RS is transmitted in symbol #3/10. If the length of the ending partial subframe is configured by 11 symbols (or four symbols), the last symbol is composed of a DM-RS symbol in which the DM-RS is transmitted. In this case, in a power transient period in which the PUSCH is switched from ON to OFF, an ON starting time point may be set to an ending boundary of the last symbol in which the DM-RS is transmitted.

Alternatively, in order to improve channel estimation performance, the index of the symbol in which the DM-RS is transmitted may be changed according to the length of the ending partial subframe.

For example, if the second slot (or the first slot) is composed of five symbols, the DM-RS may be transmitted in the third symbol of the second slot (or the first slot).

As another example, if the second slot (or the first slot) is composed of four symbols, the DM-RS may be transmitted in the second or third symbol of the second slot (or the first slot).

As another example, if the second slot (or the first slot) is composed of three symbols, the DM-RS may be transmitted in the second symbol of the second slot (or the first slot).

As another example, if the second slot (or the first slot) is composed of two symbols, the DM-RS may be transmitted in the first or second symbol of the second slot (or the first slot).

As another example, if the second slot (or the first slot) is composed of one symbol, the DM-RS or the PUSCH may be transmitted in the corresponding symbol. Even in this case, the last (or first) symbol may be composed of a DM-RS symbol. At this time, in a power transient period in which the PUSCH is switched from ON to OFF, an ON starting time point may be set to an ending boundary of the last (or first) symbol in which the DM-RS is transmitted.

Alternatively, the DM-RS in the slot (or subframe) which is not wholly transmitted in the UL partial subframe may be configured not to be transmitted.

The above method is equally applicable to the UL initial partial subframe.

4.4.3. UCI Piggyback Method

The UE may not expect triggering of UCI piggyback in the ending partial subframe to ensure stable transmission of the UCI.

Alternatively, as described in Chapter 4.4.2., when the symbol index in which the DM-RS is transmitted is changed according to the length of the ending partial subframe, the UCI piggyback method may be determined relative to the position of the symbol index.

For example, the RI may be transmitted in the symbols separated from the DM-RS symbol by 2 symbols backward and forward. When there is a symbol which is not transmitted due to the partial subframe in the symbols separated from the DM-RS symbol by 2 symbols backward and forward, the RI may be transmitted after being subjected to puncturing or rate matching.

In addition, even when HARQ-ACK information is allowed to be piggybacked on the PUSCH on the LAA SCell, a rule similar to the above description is applicable. That is, the HARQ-ACK information may be transmitted in the symbols separated from the DM-RS symbol by 1 symbol backward and forward. When there is a symbol which is not transmitted due to the partial subframe in the symbols separated from the DM-RS symbol by 1 symbol backward and forward, the HARQ-ACK information may be transmitted after being subjected to puncturing or rate matching.

The above method is equally applicable to the UL initial partial subframe. Specifically, as described in Chapter 4.3.1, when a signal is not transmitted at the legacy time point due to LBT failure, the UE may attempt to start signal transmission at another time point in the corresponding subframe (referred to as autonomous Tx, for convenience) or may attempt UL signal transmission an indicated new time point (referred to as fixed Tx, for convenience). At this time, a different UCI piggyback method is applicable according to autonomous Tx and fixed Tx.

For example, in the case of autonomous Tx, the UCI may be punctured and transmitted with respect to a portion where transmission is abandoned. As another example, in the case of fixed Tx, the RI may be sequentially mapped to the symbols separated from the second DM-RS symbol by 2 symbols backward and forward and the CSI may be subjected to rate matching and transmitted during a duration from the new time point to the symbol where transmission is valid.

Alternatively, in the case of autonomous Tx, when the UL-SCH is punctured, the UCI may be punctured and transmitted with respect to a portion where transmission is abandoned. Alternatively, in the case of autonomous Tx, when the UL-SCH is subjected rate-matching, the RI may be sequentially mapped to the symbols separated from the second DM-RS symbol by 2 symbols backward and forward and the CSI may be subjected to rate matching and transmitted during a duration from the new time point to the symbol where transmission is valid.

In the Rel-14 eLAA system, when the PUSCH is scheduled through multi-subframe scheduling DCI (e.g., DCI format 0B/4B), if the CSI request is triggered, aperiodic CSI may be transmitted in the last subframe among the scheduled subframes when the number of actually scheduled subframes is less than 3 and may be transmitted in the second to last subframe among the scheduled subframes when the number of actually scheduled subframes is equal to or greater than 3.

In addition, when the PUSCH is scheduled through DCI format 0B/4B, if the number of actually scheduled subframes is 2, the CSI request is triggered and the last subframe is the ending partial subframe in which UCI piggyback is not allowed (e.g., the ending partial subframe in which the number of symbols is equal to or less than X (e.g., X=4) (or the first SF is not an initial partial subframe in which UCI piggyback is not allowed), UCI piggyback may be configured in the first subframe or may not be allowed to the corresponding subframes.

4.4.4. SRS (Sounding Reference Signal) Transmission Method

In the Rel-14 eLAA system, when multi-subframe scheduling is performed through DCI format 4B, aperiodic SRS triggering may be signaled through a 2-bit signal. At this time, SRS SF #x of each state may be configured by higher layer signaling. In addition, SF #n in which the SRS is actually transmitted may be decided by the following equation. In the following equation, N denotes the number of subframes scheduled through DCI format 4B.

$$n=\mathrm{mod}(x,N) \quad [\text{Equation 1}]$$

If the last subframe among N (N>1) subframes scheduled through DCI format 4B is an ending partial subframe and SRS transmission is not allowed in the last subframe (or if the ending position where SRS transmission is not allowed is indicated), in Equation 1 above, N−1 (N>1) is applicable instead of N.

4.4.5. Coexistence of UL Ending Partial Subframe and UL Initial Partial Subframe If UL initial partial subframes and UL ending partial subframes having various lengths are introduced, the UL ending partial subframe and the UL initial partial subframe may coexist in one subframe (from the viewpoint of at least the network).

However, since it is a burden from the viewpoint of UE implementation that a plurality of HARQ processes operates in one subframe, a specific UE may not expect scheduling of the UL initial partial subframe as well as the UL ending partial subframe in one subframe.

4.5. UL Burst Indication

In the Rel-14 eLAA system, the eNB may provide the UE with configuration of UL subframes through the common PDCCH transmitted in SF #N. Specifically, the eNB may indicate the start point and duration of a period in which UL subframes start.

For example, if the start points of the UL subframes are 1(L) and the durations of the UL subframes are d(D) in the common PDCCH transmitted in SF #N, the UE may perceive subframes from SF #N+1 to SF #N+1(L)+d−1 as UL subframes and may not expect reception of the DL signal in the corresponding UL subframes. In the above description, the value 1(L) may correspond to the UL offset field of the following table and the value d may correspond to the UL duration field of the following table.

TABLE 11

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

In addition, in a PUSCH in which signal transmission starts after SF #N+1 and transmission ends within SF #N+1(L)+d−1 without a gap, a rule may be established such that the UE performs category 2 LBT (or Type 2 channel access) regardless of the LBT type (that is, random backoff based category 4 LBT or category 2 LBT for deciding transmission after performing CCA during a predetermined time) signaled on the UL grant in order to transmit the corresponding PUSCH.

Meanwhile, in order for the UE to perform category 2 LBT (or Type 2 channel access), the eNB needs to ensure that the corresponding UL subframe period belongs to the channel occupied by the eNB acquired after category 4 LBT (or random backoff based LBT or Type 1 channel access).

In the present invention, when the UL initial partial subframe and/or the UL ending partial subframe are introduced, a method of indicating a UL burst through a "UL duration and offset" field and/or a method of performing LBT by a UE may be changed.

Figure 21:
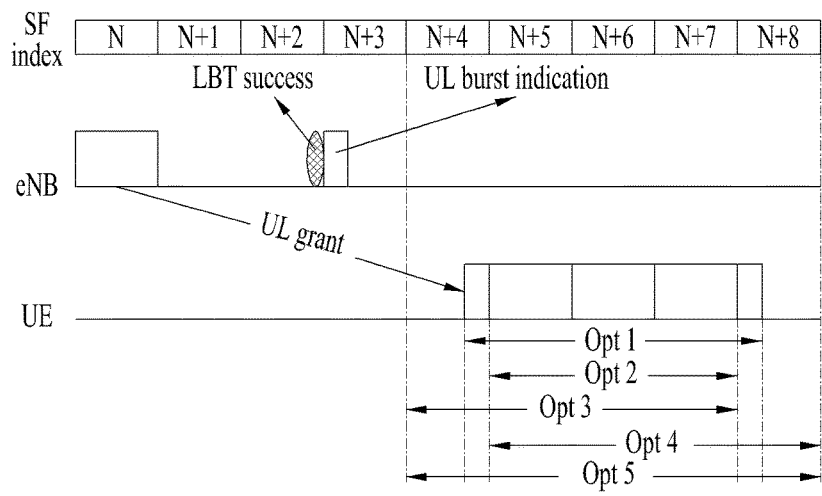
FIG. 21 is a diagram illustrating a configuration in which an eNB provides information on a UL burst to a UE according to the present invention.

FIG. 21 is a diagram illustrating a configuration in which an eNB provides information on a UL burst to a UE according to the present invention.

As shown in FIG. 21, the eNB may schedule a UL burst of SF #N+4 to SF #N+8 to the UE through a UL grant transmitted in SF #N and indicate Type 1 channel access as LBT operation. At this time, when the UL burst of SF #N+4 to SF #N+8 prescheduled by the eNB is included in the channel occupancy time secured by the eNB through the common PDCCH transmitted by the eNB in SF #N+3, the eNB may inform the UE of the UL burst through the common PDCCH using the following method.

(1) Opt 1

The "UL duration and offset" field of Table 11 has only granularity of a subframe level. However, according to the present invention, when UL partial subframes having various lengths are introduced, signaling having lower resolution (e.g., a new common PDCCH transmitted in the LAA SCell) may be introduced.

For example, the eNB may signal the time axis position of the UL burst to the UE with a slot level (or a symbol level or a plurality of symbol levels) instead of the subframe level.

Specifically, the eNB may indicate the UL burst during five slots (the corresponding information is indicated through the UL duration field) from the second slot (the corresponding information is indicated through the UL offset field) of SF #K. At this time, the UE may not expect reception of a DL signal in subframes belonging to the signaled UL burst. Alternatively, the UE may not expect reception of the DL signal only in the full SF (or the SF composed of greater than a predetermined number of symbols (e.g., 12 symbols)) among subframes belonging to the signaled UL burst and may attempt to receive the DL signal in a partial subframe (or an SF composed of a predetermined number of symbols (e.g., 12 symbols) or less).

In addition, in a PUSCH, transmission of which is finished without a gap within a period belonging to the signaled UL burst, a rule may be established such that the UE performs Type 2 channel access regardless of the signaled LBT type on the UL grant in order to transmit the corresponding PUSCH.

(2) Opt 2

In the case of Opt 1, as signaling resolution is lowered, signaling overhead may be increased. As a method of solving this, the granularity of the subframe level may be maintained like the "UL duration and offset" field of Table 11 and the UL burst may be indicated while excluding the UL initial partial subframe and/or ending partial subframe (or a partial UL SF composed of a predetermined number of symbols (e.g., 7 symbols) or less) newly introduced according to the present invention.

(3) Opt 3

In the case of Opt 2, signaling overhead may be decreased, but the LBT type may not be changed even when partial subframes belong to the channel occupancy time of the eNB.

In order to solve this, the granularity of the subframe level may be maintained like the "UL duration and offset" field of Table 11 and the UL burst may be indicated to include the UL initial partial subframe while excluding the UL ending partial subframe (or an ending partial UL SF composed of a predetermined number of symbols (e.g., 7 symbols) or less) newly introduced according to the present invention.

In this case, the first subframe of the UL burst may be the UL initial partial subframe.

Accordingly, the UE may not expect reception of the DL signal only after the first subframe among the subframes belonging to the signaled UL burst and may attempt to receive the DL signal in the first subframe.

Alternatively, when the UL initial partial subframe (alternatively, the initial partial UL SF composed of a predetermined number of symbols (e.g., 12 symbols) or more) or the UL full subframe is scheduled in the first subframe among the subframes belonging to the signaled UL burst, the UE may not attempt to receive the DL signal in the first subframe.

Alternatively, the eNB may separately signal, to the UE, information as to whether to attempt to receive the DL signal in the first subframe among the subframes belonging to the UL burst through the state "11111" of the "UL duration and offset" field.

(4) Opt 4

In the case of Opt 3, even when the UL ending partial subframe belongs to the channel occupancy time of the eNB, the LBT type may not be changed.

In order to solve this, the granularity of the subframe level may be maintained like the "UL duration and offset" field of Table 11 and the UL burst may be indicated to include the UL ending partial subframe while excluding the UL initial partial subframe (or a partial UL SF composed of a predetermined number of symbols (e.g., 7 symbols) or less) newly introduced according to the present invention.

In this case, the last subframe of the UL burst may be the UL ending partial subframe.

Accordingly, the UE may not expect reception of the DL signal only before the last subframe among the subframes belonging to the signaled UL burst and may attempt to receive the DL signal in the last subframe.

Alternatively, when the UL ending partial subframe is scheduled in the last subframe among the subframes belonging to the signaled UL burst, the UE may not attempt to receive the DL signal in the last subframe or may attempt to receive the DL signal after the UL ending partial subframe in the last subframe.

Alternatively, when the UL full subframe (alternatively, the ending partial UL SF composed of a predetermined number of symbols (e.g., 12 symbols) or more) is scheduled in the last subframe among the subframes belonging to the signaled UL burst, the UE may not attempt to receive the DL signal in the first subframe.

Alternatively, the eNB may separately signal, to the UE, information as to whether to attempt to receive the DL signal in the last subframe among the subframes belonging to the UL burst through the state "11111" of the "UL duration and offset" field.

Meanwhile, in a PUSCH, transmission of which is finished without a gap within a period belonging to the signaled UL burst and the UL initial partial subframe period of the subframe just before the UL burst, a rule may be established such that the UE performs Type 2 channel access regardless of the signaled LBT type on the UL grant in order to transmit the corresponding PUSCH. For example, as shown in FIG. 21, the UE, which has received the common PDCCH indicating that SF #N+5 to SF #N+8 is the UL burst, the UE may start signal transmission in the UL initial partial subframe when Type 2 channel access succeeds even when there is a UL initial partial subframe scheduled in SF #N+4.

(5) Opt 5

The granularity of the subframe level may be maintained like the "UL duration and offset" field of Table 11 and the UL burst including all UL initial/ending partial subframes may be indicated.

In this case, the first subframe and/or the last subframe of the UL burst may be the UL partial subframe.

Accordingly, the UE may not expect reception of the DL signal in the subframes excluding the first subframe and/or the last subframe among the subframes belonging to the signaled UL burst and may attempt to receive the DL signal in the first subframe and/or the last subframe.

Alternatively, when the UL initial partial subframe or the UL full subframe (alternatively, the initial partial UL SF composed of a predetermined number of symbols (e.g., 12 symbols) or more) is scheduled in the first subframe among the subframes belonging to the signaled UL burst, the UE may not attempt to receive the DL signal in the first subframe.

Alternatively, when the UL ending partial subframe is scheduled in the last subframe among the subframes belonging to the signaled UL burst, the UE may not attempt to receive the DL signal in the last subframe or may attempt to receive the DL signal after the UL ending partial subframe in the last subframe.

Alternatively, when the UL full subframe (alternatively, the initial partial UL SF composed of a predetermined number of symbols (e.g., 12 symbols) or more) is scheduled in the last subframe among the subframes belonging to the signaled UL burst, the UE may not attempt to receive the DL signal in the first subframe.

Alternatively, the eNB may separately signal, to the UE, information as to whether to attempt to receive the DL signal in the first subframe and/or the last subframe among the subframes belonging to the UL burst through the state "11111" of the "UL duration and offset" field.

4.6. UCI Transmission Method

As described above, when the UE fails in LBT in which a signal may be transmitted at a legacy time point, a method of allowing the UE to start signal transmission even at another time point may be defined as Mode 1 transmission. If Mode 1 transmission is set/instructed with respect to a specific UE, the UE may map UCI to a PUSCH using a second slot only method.

The above operation considers deterioration of UCI feedback performance due to puncturing of a portion which is not pre-transmitted when the UE starts signal transmission at the other time point in the case where the UE fails in LBT in which the signal may be transmitted at the legacy time point.

FIGS. 22 to 25 are diagrams illustrating configurations in which UCI is mapped to PUSCH resources according to the present invention.

In FIGS. 22 to 25, PUSCH resources are allocated with 1 RB, a horizontal axis means a single carrier frequency division multiple access (SC-FDMA) symbol and a vertical axis means a subcarrier. At this time, the time index of the SC-FDMA symbol is increased from left to right and the frequency index of the subcarrier is increased from top to bottom.

In addition, in FIGS. 22 to 25, a pattern, to which each UCI is mapped, is differently represented according to type (rank indicator (RI) and channel state information (CSI) and numerals in the equally represented regions mean the mapping orders of coded symbols.

Figure 23:
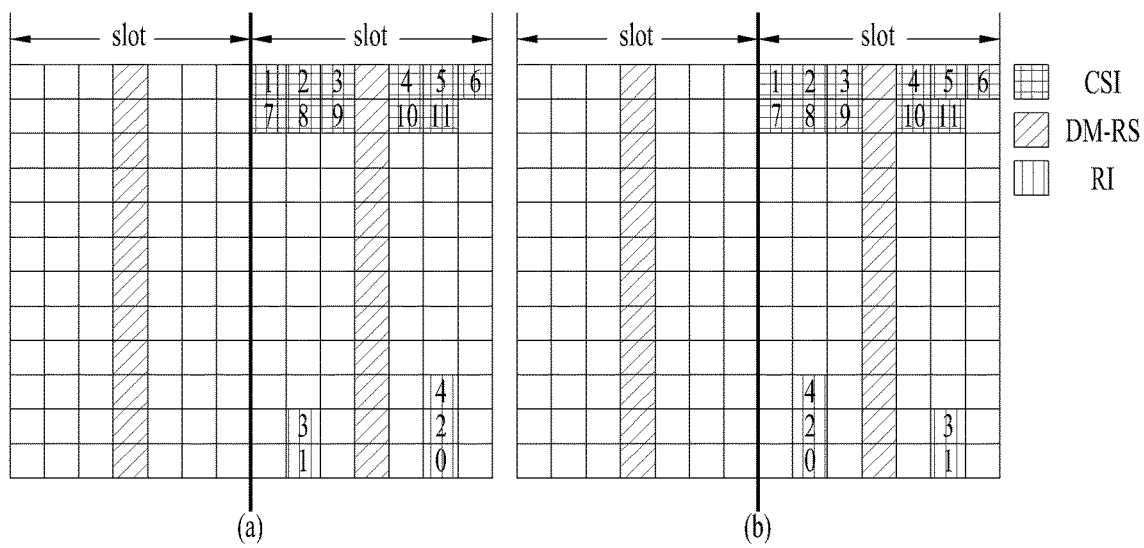

At this time, as described above, if Mode 1 transmission is set/instructed with respect to a specific UE, the UE may perform UCI mapping using a second slot only method as shown in FIG. 23. In other words, the UE may not piggyback the UCI on the first slot and may piggyback the UCI only on the second slot, thereby performing transmission.

The above operation is applicable to transmission of all PUSCHs (excluding the ending partial SF having a 1-slot length or less or having 12 symbols or less) in which UCI piggyback is instructed when Mode 1 transmission is set/instructed with respect to a specific UE.

Alternatively, when Mode 1 transmission is set/instructed with respect to a specific UE, if there is a restriction on the maximum number of subframes, to which Mode 1 transmission is applied, among continuously scheduled subframes without a timing gap, the above-described operation is applicable up to the maximum number of SFs.

Figure 22:
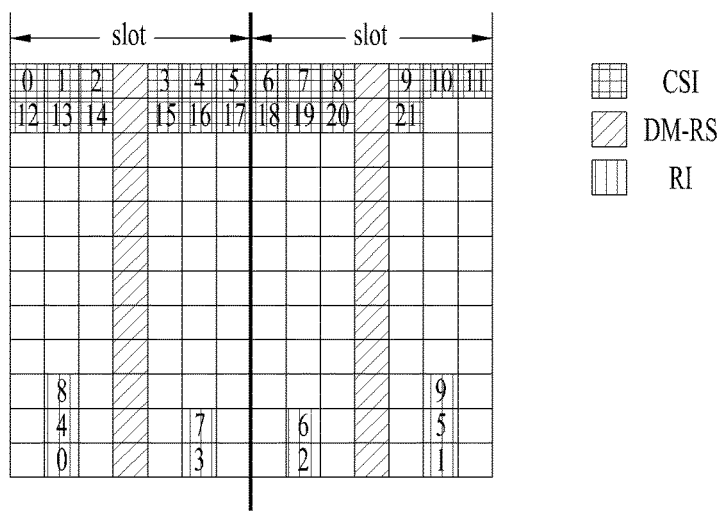
FIGS. 22 to 25 are diagrams illustrating configurations in which UCI is mapped to PUSCH resources according to the present invention.

For example, when the maximum number of subframes, to which Mode 1 transmission is applied, among the continuously scheduled subframes is 2 but four subframes are continuously scheduled, the UCI piggyback method shown in FIG. 23 is applicable if UCI piggyback is instructed with respect to one of the front two subframes and the UCI piggyback method shown in FIG. 22 is applicable if UCI piggyback is instructed with respect to one of the rear two subframes.

In addition, the above-described operation is applicable to even the case where the UE, for which Mode 2 transmission (a method of indicating a UL start time point (that is, a new time point) other than the legacy time point through a UL grant, as described above) is set/instructed, performs UCI piggyback in a subframe in which Mode 2 transmission is instructed.

As proposed above, if Mode 1 transmission is set/instructed or Mode 2 transmission is instructed or if a UCI is piggybacked only on a second slot of a specific subframe (or if rate matching is preferentially performed with respect to the second slot and then some UCIs are piggybacked on a first slot by an established rule), RI mapping may be performed through four symbols around the DM-RS. In other words, the RI may be mapped to four symbols around the symbol, to which the DM-RS is mapped. This is because HARQ-ACK is mapped to the symbol around the DM-RS symbol by puncturing the UL-SCH in the conventional LTE system but HARQ-ACK transmission in the LAA SCell, to which the present invention is applied, is not supported.

Figure 24:
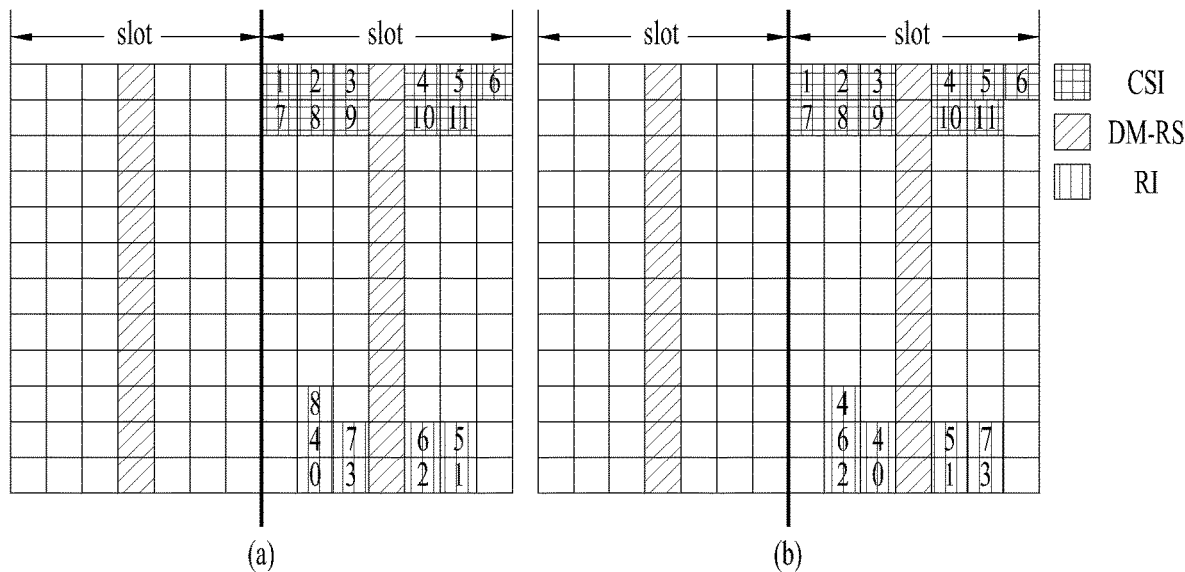
Figure 25:
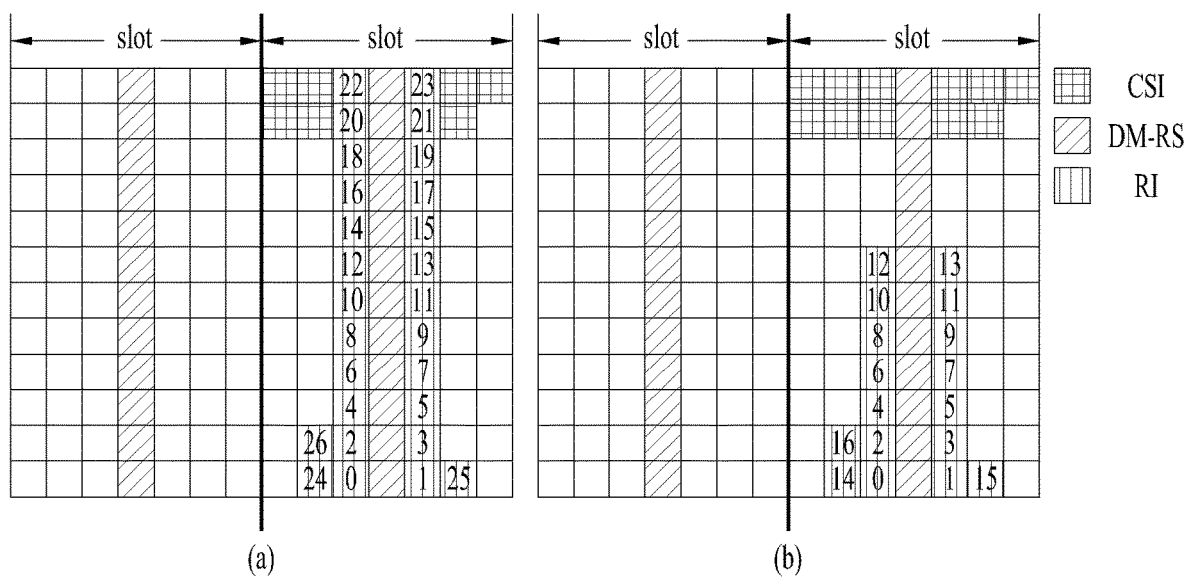

According to the above example, the RI may be mapped to four symbols around the symbol, to which the DM-RS is mapped, as shown in FIGS. 24 and 25.

At this time, the detailed RI mapping order is as follows: (1) mapping may be performed starting from an RE far from the DM-RS symbol as shown in FIG. 24(a) or mapping may be performed starting from an RE close to the DM-RS symbol as shown in FIG. 24(b). Technically, considering RI reception performance, mapping of the symbol close to the DM-RS symbol may be preferred as the RI mapping method.

Alternatively, (3) as shown in FIG. 25(a), a method of preferentially mapping the RI to two symbols around the DM-RS symbol and then mapping the RI to REs separated from the DM-RS symbol by 2 symbols backward and forward when mapping to the REs of the two symbols around the DM-RS symbol is finished over all RBs of the scheduled PUSCH is applicable. Alternatively, (4) as shown in FIG. 25(b), a method of preferentially mapping the RI to two symbols around the DM-RS symbol until a predetermined PUSCH RE position (set by L1 signaling) and then mapping the RI to the REs separated from the DM-RS symbol by two symbols backward and forward is applicable.

In addition, the above-described methods are equally applicable to the case where the UCI is transmitted only in the first slot (e.g., ending partial SF). That is, when the UCI is transmitted only in the first slot, the RI of the UCI may be mapped using four symbols around the DM-RS symbol in the first slot.

Figure 26:
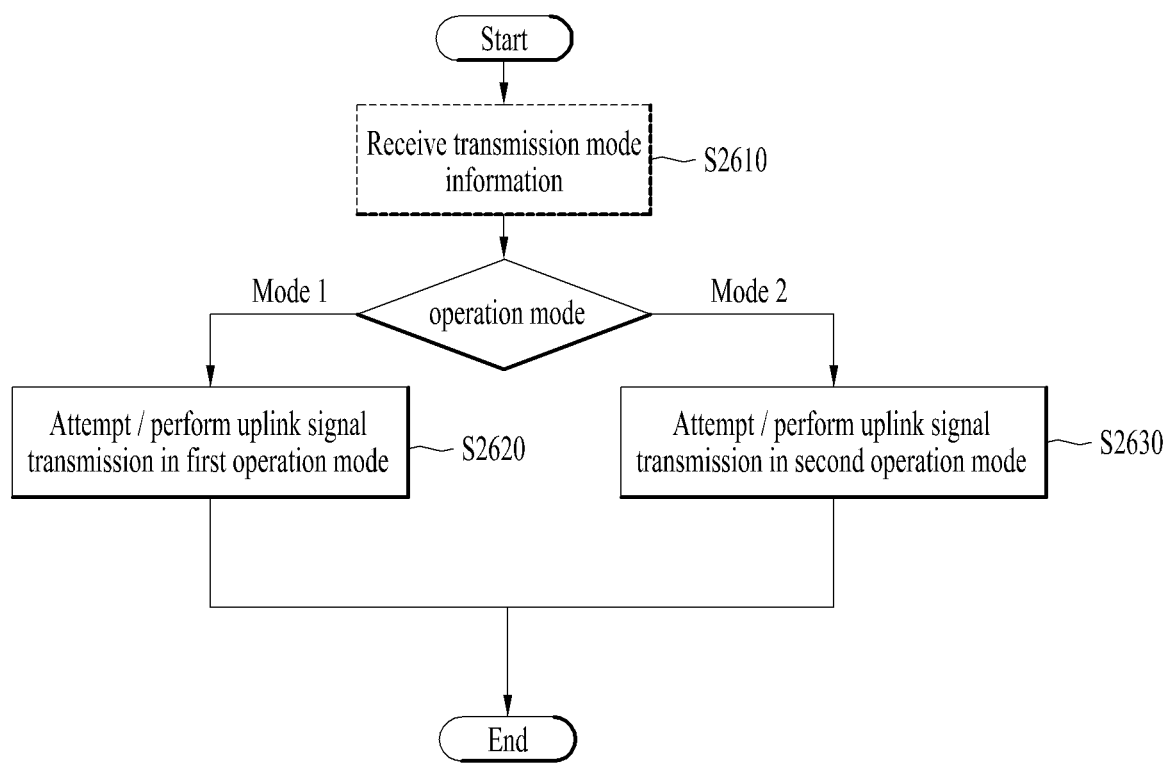
FIG. 26 is a flowchart illustrating a method of transmitting an uplink signal by a UE according to an example of the present invention.

FIG. 26 is a flowchart illustrating a method of transmitting an uplink signal by a UE according to an example of the present invention.

According to an example of the present invention, the UE may receive transmission mode information from an eNB (S2610). At this time, the transmission mode information may include first mode information indicating a first transmission mode and second mode information indicating a second transmission mode. Here, the first mode information and the second mode information may be received through downlink control information (DCI).

Step 2610 is not mandatory and the UE may determine the operation mode without the transmission mode information from the eNB.

Hereinafter, the operation of performing uplink signal transmission at the UE according to the operation mode determined based on the transmission mode information received from the eNB or the operation mode determined by the UE according to the capability of the UE will be described.

The UE may attempt/perform uplink signal transmission in the first operation mode (S2620) or attempt/perform uplink signal transmission in the second operation mode (S2630) according to the determined operation mode.

Here, the first transmission mode may mean that the uplink signal is transmitted in the unlicensed band depending on whether the UE succeeds in a channel access procedure of the unlicensed band at a first time point and a predetermined second time point after the first time point. In addition, the second transmission mode may mean that the uplink signal is transmitted in the unlicensed band depending on whether the UE succeeds in a channel access procedure of the unlicensed band at a predetermined third time point obtained by applying a predetermined time offset to the first time point.

In the above configuration, the information indicating the first time point may indicate one of (1) the boundary of symbol index #0 in a corresponding subframe; (2) the boundary of symbol index #0 in the corresponding subframe+25 μsec; (3) the boundary of symbol index #0 in the corresponding subframe+25 μsec+TA (timing advance); and (4) the boundary of symbol index #1 in the corresponding subframe as the first time point. At this time, as the TA value, a TA value set with respect to the UE is applicable.

In addition, the boundary of symbol index #7 in the corresponding subframe is applicable to the second time point.

In addition, the third time point may be obtained by applying the time offset of 0.5 ms to the first time point.

In the present invention, the UCI may be transmitted in the second slot of the corresponding subframe. At this time, the UCI may include one or more of a rank indicator (RI) and channel state information (CSI).

More specifically, when the UE operates in the first transmission mode, the UE may transmit the UCI in the second slot even in a subframe, in which the first transmission mode is not performed, among scheduled multiple subframes.

For example, assume that SF #1/2/3/4 is subjected to multi-subframe scheduling and the transmission timing of the UCI is indicated as SF #3. At this time, when the UE operates in the first transmission mode, the UE may apply the first transmission mode to only SF #1 according to the LBT result to perform signal transmission. At this time, the UE may transmit the UCI only in the second slot of SF #3.

In particular, if the UCI includes the RI and the CSI, the RI may be mapped to the symbol adjacent to the symbol, to which a demodulation reference signal (DM-RS) is mapped, with higher priority than the CSI.

In addition, when the UE successfully performs the channel access procedure of the unlicensed band at the second time point in the first transmission mode and transmits the uplink signal in the unlicensed band starting from the second time point, the uplink signal may be transmitted by puncturing the first slot of the corresponding subframe.

In addition, if the first subframe, in which the UE successfully performs the channel access procedure of the unlicensed band at the second time point in the first transmission mode and transmits the uplink signal in the unlicensed band starting from the second time point, is a first subframe of a first uplink burst, the UE may perform a channel access procedure, to which a contention window size (CWS) adjusted depending on whether new data indicators (NDIs) for the first subframe and the next subframe of the first subframe are toggled is applied, and attempt to transmit a second uplink burst which is the next uplink burst of the first uplink burst. In other words, the UE may regard the first subframe and the next subframe of the first subframe as a reference subframe and adjust the CWS for transmission of the second uplink burst.

Specifically, when at least one of the NDIs for the first subframe and the next subframe of the first subframe is toggled, the CWS for transmission of the second uplink burst is reset and, when both the NDIs for the first subframe and the next subframe of the first subframe are not toggled, the CWS for transmission of the second uplink burst may be increased to be greater than the CWS for transmission of the first uplink burst.

In addition, if the first subframe, in which the UE successfully performs the channel access procedure of the unlicensed band at the second time point in the first transmission mode and transmits the uplink signal in the unlicensed band starting from the second time point, is a first subframe of a first uplink burst and a second uplink grant which is the next uplink burst of the first uplink burst is received after four subframes from the first subframe, the UE may perform a channel access procedure, to which a contention window size (CWS) adjusted depending on whether new data indicators (NDIs) for one or more subframes included in a third uplink burst which is a previous uplink burst of the first uplink burst are toggled is applied, and attempt to transmit the second uplink burst.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

5. Device Configuration

Figure 27:
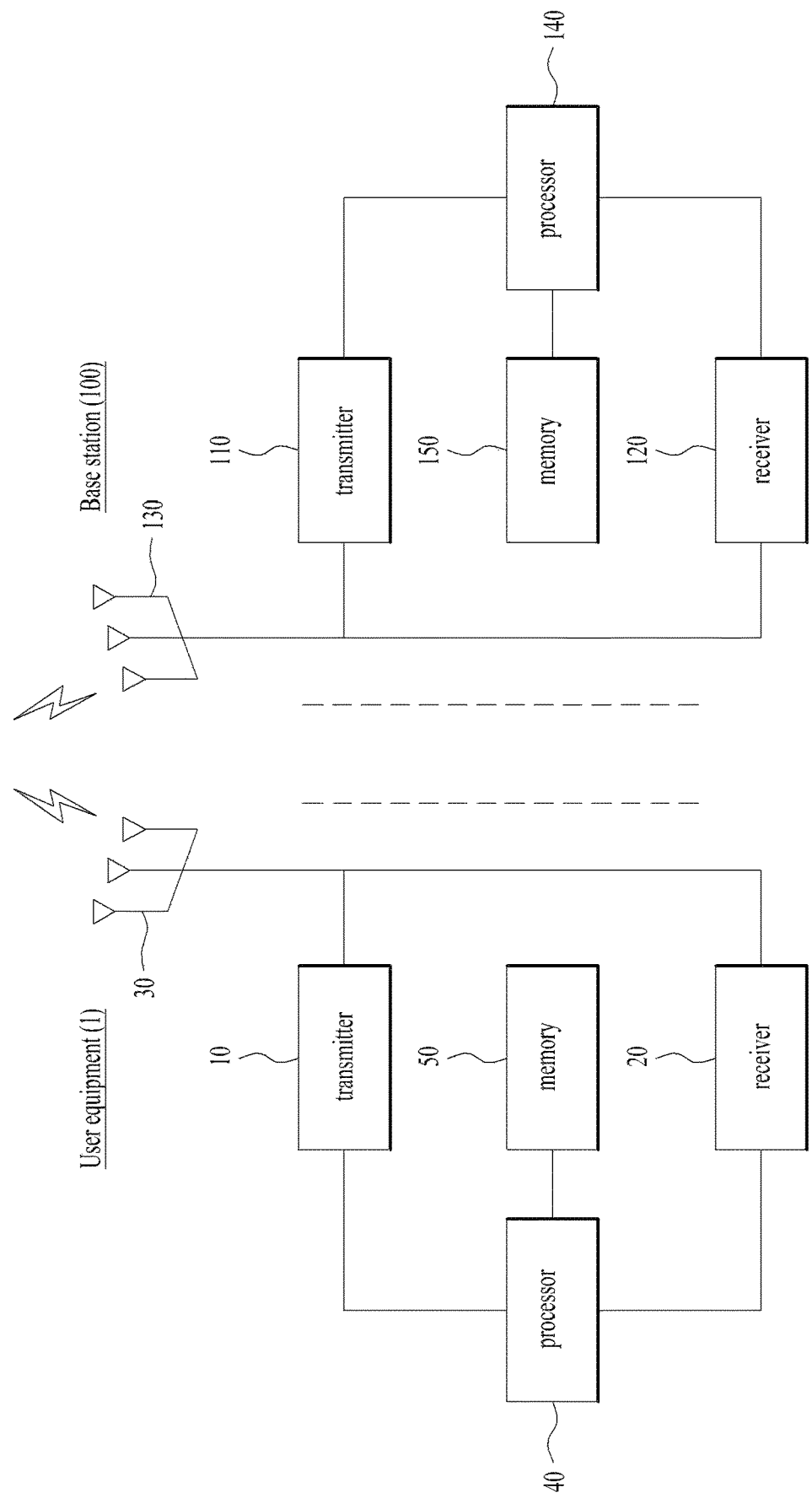
FIG. 27 is a view showing the configurations of a UE and a base station in which the proposed embodiments may be implemented.

FIG. 27 is a diagram illustrating configurations of a UE and a base station capable of being implemented by the embodiments proposed in the present invention. The UE shown in FIG. 27 operates to implement the embodiments of the above-described uplink signal transmission and reception method.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 having the above-described configuration receives information indicating a first time point for uplink signal transmission in an unlicensed band from the eNB. Subsequently, the UE 1 performs uplink signal transmission through the processor 40 in one of the first transmission mode or the second transmission mode according to the operation mode of the UE.

Here, the first transmission mode may mean that the UE transmits the uplink signal in the unlicensed band depending on whether the UE successfully performs a channel access procedure of the unlicensed band at a first time point and a predetermined second time point after the first time point. In addition, the second transmission mode may mean that the UE transmits the uplink signal in the unlicensed band depending on whether the UE successfully performs a channel access procedure of the unlicensed band at a predetermined third time point obtained by applying a predetermined time offset to the first time point.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 27 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting an uplink signal by a user equipment (UE) in a wireless communication system, the method comprising:

receiving, from a base station, Downlink Control Information (DCI) including (i) a first indicator related to a first starting position at which the UE is scheduled to perform a first attempt at transmitting a first uplink signal in an unlicensed band, and (ii) a second indicator related to a second starting position at which the UE is scheduled to perform a second attempt at transmitting the first uplink signal in the unlicensed band;

performing the first attempt at transmitting the first uplink signal to the base station in the unlicensed band, starting from the first starting position and according to a channel access procedure, wherein the first starting position is determined, based on the first indicator, as one of four starting position candidates in a time period; and based on the first attempt not satisfying at least one access condition associated with the channel access procedure, performing the second attempt at transmitting the first uplink signal to the base station in the unlicensed band, starting from the second starting position and according to the channel access procedure, wherein the second starting position is determined, based on the second indicator, as symbol index #7 in the time period wherein, based on consecutive time periods being scheduled by the DCI, whether an attempt for transmitting a second uplink signal is available in a last time period of the consecutive time periods is related to a number of the consecutive time periods scheduled by the DCI.

2. The method according to claim 1, wherein the four starting position candidates in the time period are:
  a boundary of symbol index #0 in a corresponding subframe;
  the boundary of symbol index #0 in the corresponding subframe, plus 25 μsec;
  the boundary of symbol index #0 in the corresponding subframe, plus 25 μsec, plus a TA (timing advance) value that is set with respect to the UE; and
  a boundary of symbol index #1 in the corresponding subframe.

3. The method according to claim 1, wherein the time period has a duration of 1 ms.

4. The method according to claim 1, wherein the time period consists of 14 Orthogonal Frequency Division Multiplexed (OFDM) symbols.

5. The method according to claim 1, wherein, based on the first uplink signal including uplink control information (UCI):
  the UCI is transmitted in a second slot of the time period.

6. The method according to claim 5, wherein the UCI comprises at least one of a rank indicator (RI) or channel state information (CSI).

7. The method according to claim 6, wherein, based on the UCI comprising both the RI and the CSI:
  the RI is mapped, with higher priority than the CSI, to a symbol that is adjacent to a symbol to which a demodulation reference signal (DM-RS) is mapped.

8. The method according to claim 1, wherein, based on a starting position of transmitting the first uplink signal being the symbol index #7 in the time period:
  the first uplink signal is transmitted by puncturing a first slot of the time period.

9. The method of claim 1, wherein the unlicensed band comprises at least one of a WiFi band or a Bluetooth band.

10. The method of claim 1, wherein the at least one access condition associated with the channel access procedure comprises:
  detecting that a channel for transmitting the first uplink signal satisfies an idle condition.

11. The method of claim 1, wherein the second indicator indicates that the second starting position is available to the UE for transmitting the first uplink signal in the unlicensed band.

12. A user equipment (UE) configured to transmit an uplink signal in a wireless communication system, the UE comprising:
  a transmitter;
  a receiver;
  at least one processor; and
  at least one computer memory operably connectable to the at least one processor and storing instructions that, when executed by the at least one processor, control the UE to:
    receive, from a base station and through the receiver, Downlink Control Information (DCI) including (i) a first indicator related to a first starting position at which the UE is scheduled to perform a first attempt at transmitting a first uplink signal in an unlicensed band, and (ii) a second indicator related to a second starting position at which the UE is scheduled to perform a second attempt at transmitting the first uplink signal in the unlicensed band;
    perform the first attempt at transmitting the first uplink signal to the base station in the unlicensed band, starting from the first starting position and according to a channel access procedure, wherein the first starting position is determined, based on the first indicator, as one of four starting position candidates in a time period; and
    based on the first attempt not satisfying at least one access condition associated with the channel access procedure, performing the second attempt at transmitting the first uplink signal to the base station in the unlicensed band, starting from the second starting position and according to the channel access procedure, wherein the second starting position is determined, based on the second indicator, as symbol index #7 in the time period,
  wherein, based on consecutive time periods being scheduled by the DCI, whether an attempt for transmitting a second uplink signal is available in a last time period of the consecutive time periods is related to a number of the consecutive time periods scheduled by the DCI.

* * * * *